US008341072B2

(12) United States Patent
Ramsey

(10) Patent No.: US 8,341,072 B2
(45) Date of Patent: *Dec. 25, 2012

(54) MLP FINANCING SYSTEM

(76) Inventor: Terry L. Ramsey, Frankston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/767,032

(22) Filed: Apr. 26, 2010

(65) Prior Publication Data

US 2010/0205085 A1 Aug. 12, 2010

Related U.S. Application Data

(63) Continuation-in-part of application No. 12/098,028, filed on Apr. 4, 2008, now Pat. No. 7,734,540.

(51) Int. Cl.
*G06Q 40/00* (2012.01)

(52) U.S. Cl. .......................................................... 705/38

(58) Field of Classification Search ............... 705/35–45
See application file for complete search history.

(56) References Cited

U.S. PATENT DOCUMENTS

| | | | | |
|---|---|---|---|---|
| 8,041,615 B1 * | 10/2011 | Hellman et al. | ................ | 705/35 |
| 2002/0161679 A1 * | 10/2002 | Randolph et al. | ............... | 705/35 |
| 2005/0091150 A1 * | 4/2005 | Woeber | ............................ | 705/38 |
| 2007/0271168 A1 * | 11/2007 | Zoric | ............................ | 705/36 T |
| 2007/0282725 A1 * | 12/2007 | Murstein | ......................... | 705/35 |
| 2008/0046353 A1 * | 2/2008 | Poltorak et al. | ................. | 705/37 |
| 2008/0109385 A1 * | 5/2008 | Baker | ........................ | 705/36 R |
| 2008/0249789 A1 * | 10/2008 | Sinclair | ............................ | 705/1 |
| 2009/0171860 A1 * | 7/2009 | Hoffman | ...................... | 705/36 T |
| 2012/0030084 A1 * | 2/2012 | Hellman et al. | ................ | 705/35 |

OTHER PUBLICATIONS

Ciccotello et al, "Contracts Between Managers and Investors: A Study of Master Limited Partnership Agreements", Robinson College of Business Administration, Georgia State University, Atlanta, Journal of Corporate Finance, Jul. 2001, pp. 1-23.*
MLP taps debt mart to pay off loan. (Financing Strategies)(Brief Article), Corporate Financing Week, Jun. 6, 2005, v 31, n22, p. 9(1).*
MLP adds distribution muscle. (Financing Strategies)(MarkWest Energy Partners)(Brief Article), Corporate Financing Week, Oct. 11, 2004, v 30, n41, p. 6(1).*
"MLPS: Investors Ask What Price Growth", Gas Processor Report. Tulsa: Apr. 8, 2002. p. 1.*
Goodgame, John, "Master Limited Partnership Governance", The Business Lawyer, vol. 60, Feb. 2005, pp. 471506.*
"Master Limited Partnership (MLP)", http://www.streetauthority.com/search/printpage.asp, printed Apr. 2, 2007, pp. 1-2.*

* cited by examiner

*Primary Examiner* — Ella Colbert
*Assistant Examiner* — Mohammad Z Shaikh
(74) *Attorney, Agent, or Firm* — Yee & Associates, P.C.; Rudolf O. Siegesmund; Terry Ramsey

(57) ABSTRACT

The MLP Financing System extends the properties of shares in a publicly traded entity that does not generate UBITs to create a new asset class that permits the underlying assets to be specifically structured for financing. MLP Financing System requires a minimum of three markets entering into transactions involving a company, a publicly traded entity, and a third entity in the financial industry. Each market establishes an asset value, price, yield, and risk. Asset price differentials between markets identify arbitrage opportunities. The market asset value, price, yield, risk, and financial constraints of entities operating in those markets provide the initial transaction specifications between company-MLP, financier-MLP, and company-financier.

3 Claims, 14 Drawing Sheets

FIG. 3

MARKET ASSET PRICING 1000 (PRE-PROCESSING INPUT TO MLP SYSTEM)

| (ASSETS ONLY) FINANCE MARKET 100 | COMPANY ASSET MARKET 120 | | MLP STOCK MARKET 400 |
|---|---|---|---|
| | PRODUCING MARKET 200 | NON-PRODUCING MARKET 300 | |

MLP FINANCE SYSTEM 2000

| FINANCE SPECIFICATION (ASSETS + UNITS) 700 | ORRI ASSET EXCHANGE 180 | | OPTIMIZATION SETUP (CONSTRAINTS, OBJ) 800 |
|---|---|---|---|
| | EXCHANGE PRODUCING MARKET 500 | EXCHANGE NON-PRODUCING MARKET 600 | OPTIMIZATION SOLUTION 900 |

```
(* SETUP   *)
(* Loan Choices  *)
n = 2;         (* Conventional loans   *)
nn = 1;        (* Loans for MLP units  *)

(* ************************************** *)
(* Coefficient matrix              *)
(* ************************************** *)
Clear[boundcoef, coef1, coef2, rhscoef, A1, A2, coefmat, LC, irow, jcol ]

(* Row 1 - - MLP unit value & All Debt   *)
coef1 = Flatten[{ +A1, +A2, Table[ -Subscript[LC, i][unit], {i, 1, nn}],
    Table[-Subscript[LC, i], {i, 1, n}] } ];

(* Row 2 - - Sum of all loans equals company loan requirements   *)
coef2 = Flatten[ { 0, 0, Table[1.0, {i, 1, nn}], Table[1.0, {i, 1, n}] }];

(* Coefficients of bounds for all loans  *)
boundcoef = Table[ 0.0, {irow, 1, n + nn + 2}, {jcol, 1, n + nn + 2}];
Do[ boundcoef[[irow, jcol]] = 1.0, {irow, 3, n + nn + 2 }, {jcol = irow}];

?rows  = { { 1, 0.0, 0.0, 0.0, 0.0, 0.0 }, { 0.0, 1, 0.0, 0.0, 0.0, 0.0 }};

(* Non-Negative   *)
nonneg = Table[ 0.0, {i, 1, 6}, {j, 1, 6}];
Table[nonneg[[i, j]] = 1.0, {i, 1, 6}, {j = i}];

boundcoef = Transpose[ Drop[Transpose[ boundcoef], 2]];

coefmat =  Join[ {coef1}, {coef2}, Transpose[boundcoef ], ?rows, nonneg ];

TableForm[coefmat]
```

FIG. 11A

```
(* ************************************ *)
(* Type Constraint                    *)
(* ************************************ *)
Clear[ LT, EQ, GT]
equation = Flatten[{EQ, EQ, Table[LT, {i, 1, nn}], Table[LT, {i, 1, n}],
   Table[LT, {i, 1, 2}], Table[GT, {i, 1, n + nn + 2}]}];
LT = -1;  EQ = 0;  GT = 1;

(* ************************************ *)
(* rhs matrix                         *)
(* ************************************ *)
rhscoef = Join[{0.0}, {LoanC},
   Table[ Subscript[maxloan, i], {i, 1, n + nn}], {ORRlmaxP, ORRlmaxNP},
   Table[0.0, {i, 1, n + nn + 2}]];

(* ************************************ *)
(* LP INPUT                           *)
(* ************************************ *)
optimization = "minimize";

obj = Flatten[{ 0.0, 0.0, Table[ -Subscript[LC, i][unit], {i, 1, nn}],
   Table[-Subscript[LC, i], {i, 1, n}] } ];

coefmat = coefmat;

rhscoef = rhscoef;
equation = equation;
rhs = Table[ {rhscoef[[i]], equation[[i]]}, {i, 1, Length[ rhscoef]}];

LPdata = { obj, coefmat, rhs }
(* ************************************ *)
(* LP SOLUTION                        *)
(* ************************************ *)
LinearProgramming[ obj, coefmat, rhs ]
```

FIG. 11B

MLP FINANCING SYSTEM

RELATED APPLICATIONS

This application is a continuation-in-part of application Ser. No. 12/098,028, filed Apr. 4, 2008, for which a Notice of Allowance issued Jan. 25, 2010, and which is herein incorporated by reference. This application claims priority from provisional application 60/940,647, filed May 29, 2007.

FIELD OF THE INVENTION

The invention relates generally to the financing of natural resource development and relates specifically to exchanging mineral rights and royalty rights for publicly traded shares in a master limited partnership to create value and provide a new way to secure loans for resource development.

BACKGROUND OF THE INVENTION

The exploration, development, and exploitation of natural resources in the petroleum and mining industries are high risk, capital-intensive ventures. The companies engaging in the exploration, development, and exploitation of natural resources frequently require financing. Over the life cycle of a petroleum or mining company, financing may be required for loans, acquisitions, or mergers with other companies. Although there are risks associated with any financial transaction, there are additional risks specific to the exploitation of natural resources. Risks include geological, engineering, and management risks, in addition to risks associated with the size of the package of assets involved in the transaction.

The size of the package of assets exemplifies the risks associated with a package of petroleum wells. Typically, 20% of the wells have 80% of the value reflecting an underlying exponential distribution of value. The result is that a small number of wells in a package of assets may create a high variance in possible returns, while a large number of wells in a package of assets will reduce variance in possible returns.

Traditional financing structures may not mitigate the high investment risk related to the exploration, development, and exploitation of natural resources. Investment risk is particularly high for wildcat exploration in unproven fields, so that historically financing has not been possible. Less risky are the small packages of assets, but high volatility of returns with small packages often precludes financing or makes financing very expensive. Large low risk packages of assets can be financed, but the loan size may be only a small fraction of the assets value. The combination of high risk and low collateral value to investors in financing natural resource exploration results in prohibitively expensive financing options, and that is the case if financing is available at all.

Attempts to reduce financing transaction risk begin with contractual relationships between the company and the financial community. For a long time banks have used contractual relationships to control risk, by limiting their exposure and aggregating assets to collateralize a loan. By federal statute, banks are limited by charter from lending 100% on real estate or petroleum transactions, regardless of how well the loan is collateralized.

Each market must first determine a value of a package of assets. There are different procedures for determining value, and different markets each require a specific procedure. Each valuation procedure is a mathematical representation of value. These known asset valuation procedures lend themselves to designing a business process that mitigates some of the problems in financing risky ventures.

Examples of mathematical representations of value include, but are not limited to: present worth, cash flow, risk adjusted value, and expected value. Cash flow ("CF") is the annual revenue generated by an investment. CF is commonly used in financial markets to evaluate the annual return on investment of bonds and perpetuities. Present worth ("PW") is the sum of the discounted cash flow from an asset. The discount cash flow includes the cost of money and may include an additional interest rate designated as the "risk premium." PW is widely used in valuing low to medium risk assets.

Risk Adjusted Value ("RAV") provides a valuation metric for decision purposes in high risk investments that is equivalent to PW used for low risk investments. The basis for the RAV analysis is exponential utility theory that discounts for risk using a buyer's risk preferences. RAV was developed for managing oil and gas exploration and investment portfolios beginning in about 1977 and is widely used today. In addition to petroleum and mining, RAV is used by insurance companies to evaluate high-risk investments and high-risk investment portfolios. RAV is commonly used in exploration markets in the same way that PW is used in production markets.

Expected Value ("EV") is used in valuing wildcat Overriding Royalty Interest ("ORRI"). Mineral interests are divided into operating and non-operating interests. The operating or working interest pays all investment and operating costs and is subject to the outstanding non-operating royalty and ORRI interests. Royalty is a gross revenue interest reserved by the landowner. The overriding royalty ("ORRI") is similar to the landowners royalty, but derives from the oil and gas lease. The ORRIs are valued in terms of the acreage and wildcat well drilling costs because these are the company's investments at risk. The company considers the risks and rewards of the working interest acceptable and competitive within the industry. The ORRI valuation is based upon the drilling company's valuation. In addition, the ORRI pays no investment or operating expenses and is usually valued at about twice the working interest per share of revenue interest.

One example of equity financing for natural resource exploitation is a high-risk loan compensated by both a nominal interest rate and an assignment of a small ORRI. However, the ORRI is subject to the same variance as the underlying assets, the transaction is taxable, the ORRI is not liquid, and the transaction only involves two parties.

Royalty financing of natural resource exploitation has been used for a long time. Investors buy a royalty interest from a company. The company uses the money for whatever its needs might be. Royalty financing is a sale of royalty unless there is a stipulation that the company gets the royalty back when the royalty buyer realizes a specified return from the royalty income. Royalty financing does not reduce risk. Royalty financing does not offer an improved price over industry standards. Royalty financing does not improve liquidity. Moreover, in royalty financing, the transaction is taxable, and the transaction only involves two parties. When the transaction between the two parties, the company and the financial community, is limited to one market, the risk can only be shared between the two parties.

The financial community was the first to realize that the same assets had different values in different markets. This concept contrasts with the efficient market theory of modern economics. The late Fisher Black who moved from Massachusetts Institute of Technology to Wall Street commented, "Markets look a lot less efficient from the banks of the Hudson than from the banks of the Charles." This difference in market values is a foundational principal behind arbitrage. Arbitrage is the practice of taking advantage of a price differential between two or more markets. Arbitrage matches buyers and sellers in different markets, striking deals that capitalize upon the imbalance, the profit being the difference between the market prices.

Tax consequences are another important consideration when valuing and exchanging assets, particularly for exchanges between markets with arbitrage. Under IRS rulings, real estate and petroleum properties are of like kind. IRS Section 1031 gives someone who sold real estate six months to invest in a like kind investment. Consequently, an IRS Section 1031 market for royalties and overrides has developed. A higher price could be realized for royalties in this market because the buyers are primarily interested in preserving their capital and avoiding taxes. The IRS Section 1031 market is a true exchange market that does not reduce risk.

Petroleum Strategies, Inc. in Midland, Tex., was founded in 1991 to assist in structuring the sale of oil and gas properties to qualify for tax savings under IRS Section 1031 regulations. The company has facilitated over $6 billion in exchange transactions, providing service to major oil companies, independent operators, and individuals.

Noble Royalties in Dallas, Tex. began selling producing minerals and royalties in approximately 1995, and in 2005 began selling assets into the IRS Section 1031 market to realize improved value by arbitrage.

The IRS Section 1031 market created the first arbitrage between markets for petroleum assets. Industry experts estimate that in 2007 50% of all mineral or royalty asset sales for cash were IRS Section 1031 transactions. Therefore, a need exists for a way to extend the benefits of asset exchange and arbitrage to markets other than the IRS Section 1031 market.

A new business structure specifically designed to work with different markets is the Master Limited Partnership (MLP). The MLP is a publicly traded limited partnership composed of underlying, non-liquid assets. However, if asset exchange between a company and an MLP is to be tax free, the assets must be of "like kind" with no unrelated business income taxes ("UBITs"). A UBIT may also be referred to by persons skilled in the art as an unrelated business taxable income or UBTI. As used herein, "UBIT" and "UBTI" shall have the same meaning. Real Estate and oil and gas interests are "like kind", but only oil and gas mineral and royalty interests generate revenue with no UBITs. MLP as used herein shall refer to a MLP with assets of producing royalty and mineral interests that does not generate UBITs. Tax free exchanges can be made with an MLP. An MLP qualifies if the MLP is publicly traded and has assets that do not generate UBITs. A qualifying MLP is a potential source for Units to be exchanged for royalty interests. Each unit of a MLP represents a fractional interest in the assets of the MLP. Under Internal Revenue Code Section 721 assets can be exchanged for tax free units. Specifically, Internal Revenue Code Section 721 states "[n]o gain or loss shall be recognized to a partnership or any of its partners in the case of a contribution of property to the partnership in exchange for an interest in the partnership.

MLP Units are traded daily on the stock exchange providing liquidity. The mineral and royalty based MLP Units have the ability to attract large sums of capital if the yield on the MLP Units exceeds the short-term bond yield by a few percent. Producing mineral and royalty interests are acquired by an MLP and the revenues are distributed monthly to holders of MLP Units. Asset exchanges with the MLP for MLP Units are frequently referred to as tax-free, but are actually tax-deferred. Tax-free asset exchange eliminates costs associated with transforming risk, accessing new markets, or accessing new capital sources. Asset exchange simplifies transactions because all assets have identical future pricing. In the asset exchange, both buyers and sellers apply their respective future pricing scenarios to both assets in arriving at present day values. The resulting asset exchange is based upon relative values, which are independent of future prices for all transaction parties. Furthermore, asset exchange converts oil and gas interests into MLP Units that are not subject to the same regulations and financial constraints creating an opportunity for arbitrage. The opportunity for arbitrage enables financing to be based upon a larger percentage of the underlying asset value.

An example of an MLP is the Sabine Royalty Trust (Sabine), which has been listed on the New York Stock Exchange under the stock symbol, SBR for some 20 years. Sabine is composed of only producing mineral and royalty interests. Sabine is prevented from buying or acquiring properties by its prospectus and is a declining asset. However, over the history of Sabine, unit price and annual dividends have been linearly related. The stock market values Sabine as a perpetuity rather than a declining asset illustrating the presence of multiple market values for the mineral and royalty assets.

A need exists for a method to capitalize on the properties of the MLP to enable or enhance energy financing. In traditional financing transactions for the exploration, development, and exploitation of natural resources, valuation of assets is limited to one market, such that risk reduction through asset exchange and arbitrage are not possible. Therefore, a further need exists for a way to facilitate the movement of assets between markets so that risks can be reduced and asset values can be maximized. Furthermore, a need exists for a way to restructure the underlying assets to enable otherwise marginal financial transactions to take place.

SUMMARY OF THE INVENTION

The MLP Financing System (MLPFS) provides a new way for a company with qualified assets to secure loans for resource development. The MLPFS requires an MLP having an asset base of royalty and mineral interests that do not generate any UBTI. A new asset class with properties valuable to the finance industry is created by exchanging the company's qualified assets for MLP units. The asset exchange may be an Internal Revenue Code Section 721 exchange or the assets may be acquired for cash at the company's option. Risk is reduced by diversification of assets in the MLP, and the MLP units are tradable and therefore liquid. The creation of the new asset enables financing to be provided on terms where the financing otherwise would not be available or acceptable. The MLPFS has units traded in the stock market and a financier, operating in a financial market, to work with the company. First, the MLPFS creates a new asset class by exchanging a fractional interest of the revenue asset, either royalties, minerals, or over ridding royalty interests for a number of shares of the MLP. Next, MLPFS acquires a desired financing condition such as a loan term from the company, a return on investment requirement from the financier, and a qualified master limited partnership return on investment from the MLP. Constraints are provided to an optimization set up, and a solution calculated whereby a loan, or loans, are identified that meets the requirements of each entity based upon a collateralization by a plurality of shares in the MLP that had been exchanged for an interest in the revenue asset.

The MLPFS requires a minimum of three markets entering into transactions involving a company, an MLP, and a third entity in the financial industry. Each market establishes an asset value, price, yield, and risk. Asset price differentials between markets identify arbitrage opportunities. Each market has its own constraints that limit or contribute to possible transactions. The entities operating in those markets also have their own financial constraints in terms of target returns and risk. The market asset value, price, yield, risk, and financial constraints of entities operating in those markets provide the initial market transaction specifications between company-MLP, financier-MLP, and company-financier.

Given the market valuations, and the initial market transaction specifications, MLPFS determines: if Asset Exchange is possible, what is the maximum arbitrage possible, and if financing is feasible, and specifies an optimum solution, usually minimizing the financial cost to the company while meeting or exceeding the financial requirements of both the MLP and financier. The MLPFS is presented in the context of a simple linear programming (hereafter "LP") optimization solution to illustrate how linear financial constraints can be setup to include arbitrage, asset exchange, and the benefits of including a new asset class in the financing process. The LP solution illustrates that the MLPFS can be applied to a wide variety of financing situations by asset restructuring. If all constraints are satisfied while meeting or exceeding the financial requirements through Asset Exchange and Arbitrage, then the extent, form, and risk of assets are specified for each transaction variable. MLP Financing can also be applied with non-linear optimization if required.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

FIG. 3 depicts Market Asset Pricing and MLPFS Components;

FIG. 11A depicts a Matrix Generator for LP Input: Constraints, Type, & RHS;

FIG. 11B is a continuation of FIG. 11A further depicting the Matrix Generator for LP Input;

DETAILED DESCRIPTION OF THE PREFERRED EMBODIMENT

Figure 1A:
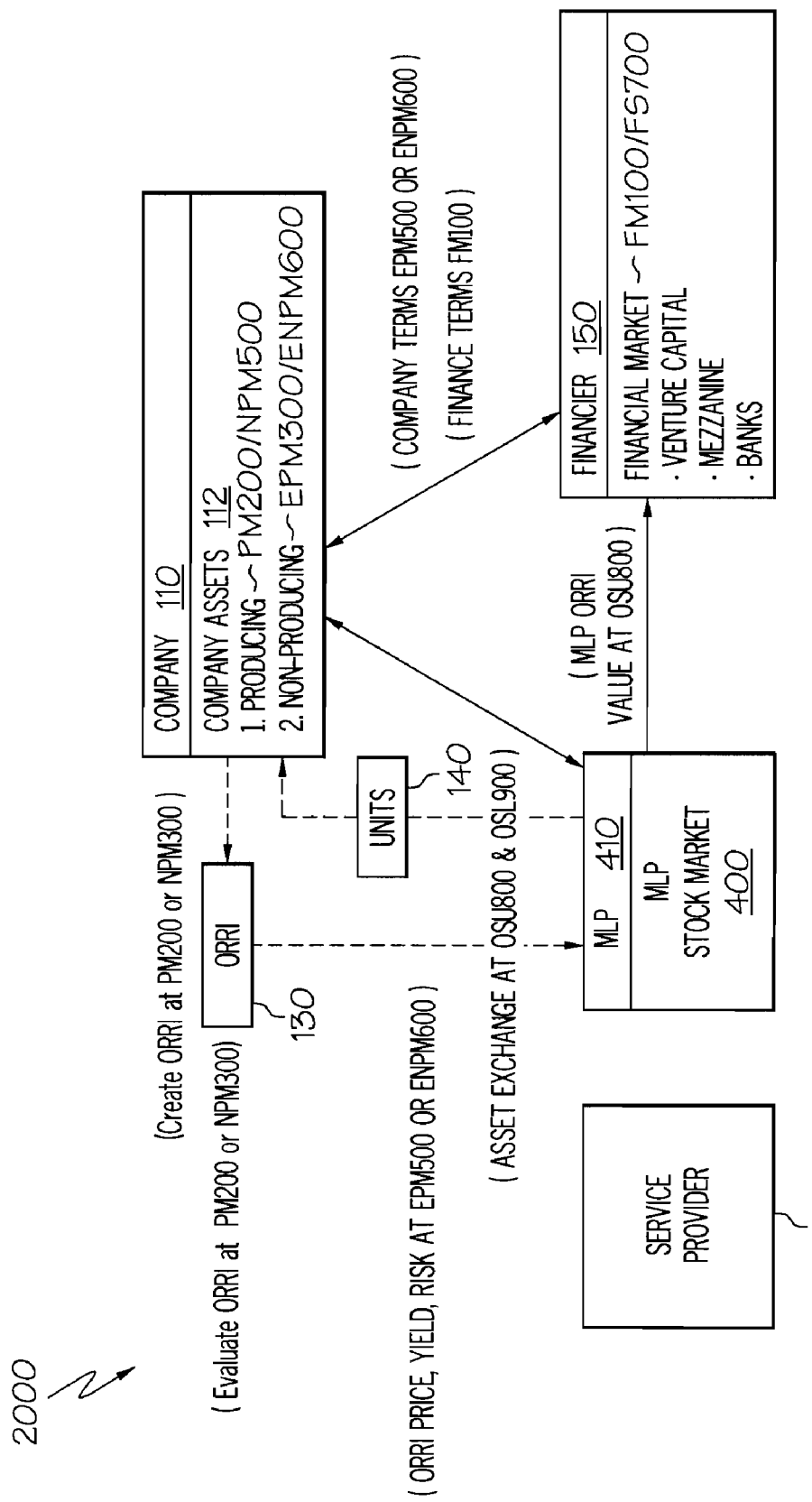
FIG. 1A depicts a flow of financial transactions and transaction partners when using the MLPFS.

The principles of the present invention are applicable to a variety of financial transactions between companies or individuals and the financial community in the exploration, development, exploitation, and production of natural resources. For convenience, terms related to petroleum production are used throughout the specification; however, the prior art discussed herein and the MLP Financing System can be applied to mining and other forms of natural resource exploitation as well.

The term "financial transaction" as used herein refers to the financing of any business activity and may include loans, acquisitions, mergers or other activities involving debt or equities. A "financial transaction" involves two or more parties and may involve more than one market. A "financial transaction" is composed of equalities or inequalities of bounded variables when used in Linear Programming.

As used herein, a "market" means a place where assets are consistently valued according to a mathematical representation of value.

As used herein, "ORRI" means an over ridding royalty interest, but is also used herein to include both royalty and mineral interests.

"Assets" as used herein means both producing and non-producing working interests, and mineral and royalty interests. "Assets" valuation are market dependent. "Assets" may be bought and sold in a market, or bought in one market and sold in another market. When transferred from one market to another market "Assets" may be transformed to reflect the destination market valuation. For example, producing mineral and royalty interests are traded in industry as physical assets and may be valued according to present worth, but when the same assets are exchanged for MLP Units, only the MLP Units are traded on the stock market and they are valued according to cash flow.

"Valuation" or "Value" is a mathematical representation of value for that market.

"Risk" as used herein is a chance process that may generate one out of several possible outcomes. Risk may be measured by the probability of success, the probability of loss, the worst possible outcome, the best possible outcome, the variance of a distribution, expected value, or risk adjusted value according to exponential utility theory. Exponential utility theory uses one number to express risk attitude, the "risk aversion," to reflect the individual company's preferences toward risk.

"Risk Adjusted Value" (RAV) is a logical, consistent, and simple means of representing all of the expressions of risk and of risk attitude discussed so far. Management objectives for both the MLP and Financier are expressed by a minimum yield or return on investment.

As used herein, MLP means a master limited partnership that is (1) publicly traded, and (2) has assets that do not generate UBITs.

"Current Yield" is the annual return divided by the future net revenue expressed as a dividend or interest rate.

Financing options available to a company can be very large. For example, there may be several different financiers where some financiers will provide financing collateralized by physical assets, but others will only lend if the entire company is collateralized. The extent of financing, types of financing, and cost of financing from each financier varies widely. A set of consistent equations involving unknowns and given constants can be written to describe the financing environment, but such equations are not sufficient to determine the unknowns uniquely. The problem is to demonstrate how MLP Financing System applies to the infinite number of possible solutions. Applicant to an infinite number of solutions is accomplished by requiring that the system be linearly dependent, that all variables be nonnegative, and that the selected solution minimizes some function of variables.

Transactions can be written down that relate all of the possible financial activities and a solution found to the infinite number of possible solutions. Characterizing the problem in terms of optimization is an efficient means of describing how the MLP Financing System employs Asset Exchange, a new class of assets for financing, and Arbitrage to contribute to a very large set of financing possiblities.

The MLP Financing System includes three financing partners, company 110, financier 150, and MLP 410. FIG. 1A illustrates how these transaction partners are linked by transactions. Company 110 creates an ORRI asset 130 to be exchanged for Units 140 in order to enable financing, or in order to achieve financing terms that are more favorable to the company than those available prior to the exchange. The company's asset exchange is driven by the company's desire for funding, and the financial communities desire to reduce risk. FIG. 1 provides an overview of inputs to the MLP Financing System for both Producing Market and Non-Producing Market conditions as detailed in FIG. 6. The company has company assets that are producing and non-producing. Therefore, company assets are valued as producing market (hereafter PM) 200, exchange producing market (hereafter EPM) 500, non-producing market (hereafter NPM) 300, and exchange non-producing market (hereafter "ENPM") 600. MLP 410 exchanges Units 140 for ORRI 130. ORRI 130 is created and evaluated by Company 110 at PM 200 and NPM 300. The price, yield, and risk for ORRI 130 is determined at EPM 500 and ENPM 600. The asset exchange of ORRI 130 for Units 140 is based on the optimization set-up (hereafter "OSU" 800 and solution (hereafter "SL") 900. Financier 150 provides finance terms at Financial Market (hereafter "FM") 100. Company 110 provides company terms at EPM 500 or ENPM 600. Because the interaction of Company 110, MLP 410 and Financier 150 can be complex, Service Provider 50 accepts data from Company 110, MLP 410 and Financier 150 to calculate and report a solution (See 50, FIG. 2).

Figure 1B:
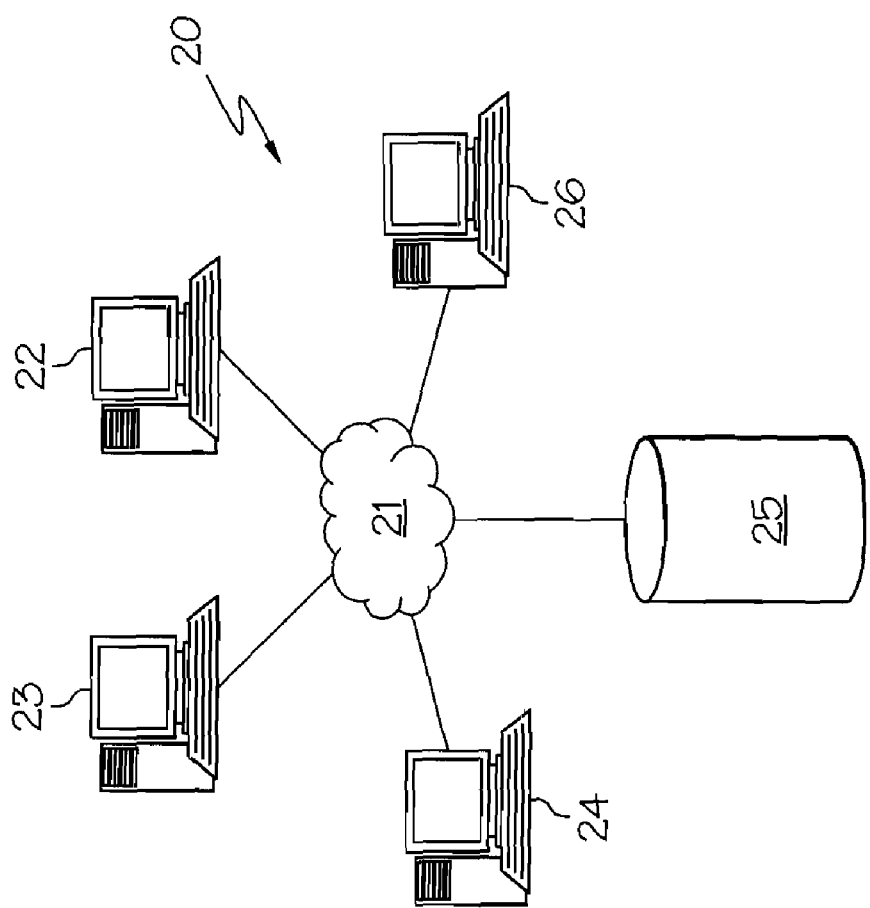
FIG. 1B depicts an exemplary computer network over which the MLPFS can operate.

FIG. 1B depicts an exemplary network of hardware devices. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 20 has only a limited number of nodes, including workstation computer 22, workstation computer 23, workstation computer 24, server computer 26 and persistent storage 25. Network connection 21 comprises all hardware, software, and communications media necessary to enable communication between network nodes 22-25. Unless otherwise indicated in context below, all network nodes use publicly available protocols or messaging services to communicate with each other through network connection. The principles of the MLP Financing System are applicable to a variety of computer hardware and software configurations. The term "computer hardware" or "hardware," as used herein, refers to any machine or apparatus that is capable of accepting, performing logic operations on, storing, or displaying data, and includes without limitation processors and memory. The term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs typically stored in a memory. The term "memory," as used herein, includes without limitation any volatile or persistent medium, such as an electrical circuit, magnetic disk, or optical disk, in which a computer can store data or software for any duration. A single memory may encompass and be distributed across a plurality of media. Further, the MLP Financing System may reside in more than one memory distributed across different computers, servers, logical partitions, or other hardware devices.

Figure 2:
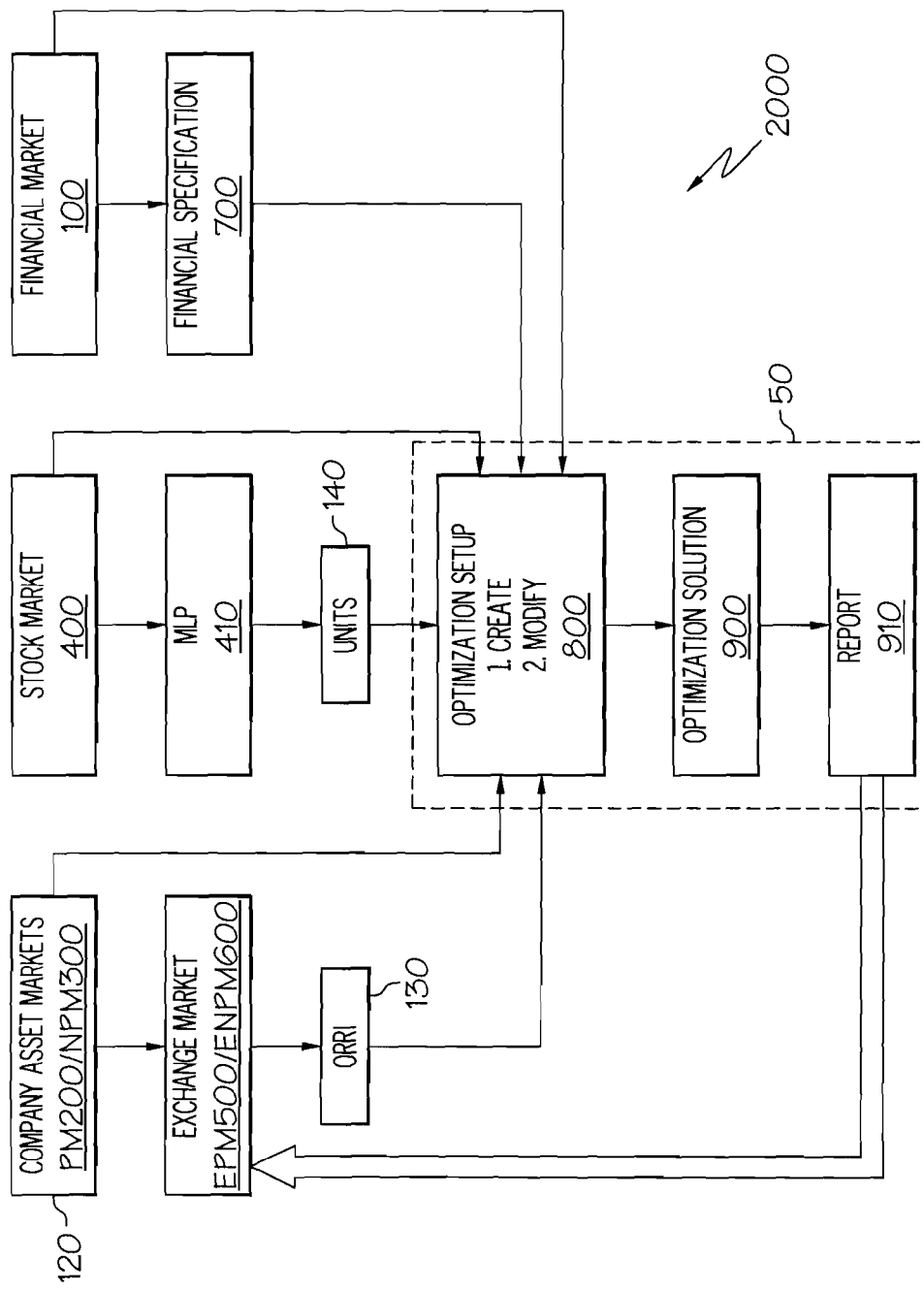
FIG. 2 depicts contributions of both markets and entities (company, MLP, financier) to constraints, limits, and optimization criteria leading to a solution.

FIG. 2 depicts an overview of the MLP Financing System showing the flow of information to Service Provider 50 (See FIG. 1) Optimization Setup 800 how adding a new business structure, MLP 410, to the traditional company-financial community transactions provides a new capital source and new markets for financing that create new transaction possibilities and modify existing transactions through OSU 800. MLP 410 has introduced stock market 400, into the company-financier transactions. The exchange of assets between company 112 and MLP 410 creates a separate asset class comprising Units 140 exchanged for ORRI 130. The separate asset class is low risk and has liquidity. MLP 410 thus permits assets, ORRIs, to be moved between markets with the result that risks can be transformed and asset values can be maximized by arbitrage. Lower risk and higher values enable many otherwise marginal financial transactions to take place by reducing the cost of the financial transactions. The addition of MLP 410 has created many new financing possibilities where only a few originally existed in FM 100. Out of the infinitely many possible solutions, optimization set-up 800 selects that unique set of variables that minimize a specified function of transaction variables and provide solution 900. Service Provider 50 process includes receiving and providing data as shown to Optimization Setup 800, calculating Optimization Solution 900 and preparing Report 910.

FIG. 3 illustrates the relationship of Market Asset Pricing 1000 input to MLPFS 2000. Market Asset Pricing 1000 comprises FM 100, PM 200, NPM 300, and stock market 400 for the Units 140 (see FIG. 1). MLPFS 2000 comprises Finance Specification 700, EPM 500 and ENPM 600 that define transactions between Financier 150 and Stock Market 400. The transactions are converted to constraints by optimization set-up (hereafter "OSU") 800. OSU 800 computes constraint coefficients, and specifies constraints of the system, the non-negativity conditions, and the objective function to generate solution 900 by linear programming as illustrated in FIG. 4 and FIGS. 6-10.

Optimization solution (hereafter "OSL") 900 is calculated based on input from OSU 800 which is received in a specific format conforming to OSU 800. Optimization solution 900 is used to determine whether it is feasible for the producing or non-producing ORRI created and market priced by the company to be exchanged for MLP Units, while satisfying the company's financing objectives, the financial target yield, and the MLP financial target yield. If a solution is feasible, OSL 900 solves the set of constrained transactions to minimize the company's financial cost while satisfying all constraints, target yields, and risk considerations.

Asset evaluation involving the components of Market Asset Pricing 1000 can take a wide range of forms because specialized techniques have been developed for different asset risk categories. However, it is within the scope and appropriate use of such techniques to provide a market value, price, yield, life, and risk for each asset analyzed. These parameters are supplied as input to one or more of the MLP Finance System (hereafter "MLPFS") 2000 components. MLPFS 2000 components comprise EPM 500, ENPM 600, Finance Specification 700 and OSU 800. Examples of two different evaluation techniques are provided to illustrate the application of MLPFS 2000, but these examples are in no way intended to be representative of the entire field of analysis techniques or procedures.

FS 700 (see FIG. 3; further illustrated in FIG. 9) uses the market information on all loan types, including conventional asset loans, entered at FM 100 to contribute to a mixed asset financing transaction using both company producing assets and Units 140 from ORRI Asset Exchange 180 to determine if financier 150's target yield can be achieved with the company's terms. There are many types of financial transactions that are possible with PM 200 assets in combination with Units 140 and MLPFS 2000 further enhances value. With NPM 300 assets, risk reduction largely defines the type of financial transactions possible. In an extreme case, individuals, such as geologists with an ORRI in a wildcat, may use MLPFS 2000 as a means of self-insuring the realization of some compensation from the wildcat, even if it is a dry hole.

```
(*    ***************************************    *)
(*         Producing ORRI Arbitrage Value          *)
(*    ***************************************    *)
(*         ASSET EXCHANGE CRITERIA                 *)
```

$$AX = (1 - \text{MLPtarget}) - \frac{\text{costP}}{\text{fnrORRIP}};$$

$$A1 = \text{If } [AX > 0, (1 - \text{MLPtarget}) * (\text{fnrORRIP}), 0.0]$$

ENPM 600 criteria has a similar procedure, but the adjusted value, RAV, must first be associated with a share of ORRI designated as β. The lesser of "best share" (bestβ) or the maximum non-producing ORRI available for asset exchange, ORRImaxNP, specified by the company becomes the basis for comparison. The maximum value available for investment is computed at 100% ORRI and the cost, costNP, is subtracted to determine if arbitrage is possible. If arbitrage is possible, the arbitrage transaction coefficient A2 is set to the maximum available value.

```
(*    ***************************************    *)
(*        Non-Producing ORRI Arbitrage Value       *)
(*    ***************************************    *)
A1   =   0;
(*    **************************                  *)
```

$$\text{best } \beta = \left(\frac{1}{r}\right) * \left(\frac{1}{R}\right) * \text{Log}\left[\frac{p}{(1-p)} * \left(\frac{R}{\cos \text{tNP}}\right)\right];$$

$$\beta = \text{Min }[\{\text{best } \beta, \text{ORRImaxNP}\}];$$

$$\text{RAV} = -\left(\frac{1}{r}\right) * \text{Log}[p * \text{Exp }[-r * \beta * (R - \text{costNP})] + (1-p) * \text{Exp }[r * \beta * \text{costNP}]];$$

```
(*          ASSET EXCHANGE CRITERIA:                        *)
(*          MaxPrice for 100% = (1 - MLPtarget) *RAV/β       *)
(*          Cost 100% = cost NP         *)
g1   =      (1 - MLPtarget) * RAV/β;   (* Max avaialble to invest *)
g2   =      (costNP);                   (* Investment cost        *)
AX   =      g1 = g2;
A2   =      If [AX ≧ 0.0, g1, 0.0
            Constraint coefficients are computed for all constraints.
```

OSU 800 in FIG. 3 represents objective decision criteria and the related transaction constraints in a linear programming format. Information is integrated and synthesized from each of the components 100 through 700 shown in FIG. 3 to define the appropriate transactions and optimization objectives for mixed asset financing. OSU 800 uses parameters calculated from Stock Market 400, EPM 500, ENPM 600, and Financial Specification 700 and from variables defined in table 4, table 5, and table 6 as input variables to charaterize the financial requirements of company 110, financier 150, and MLP 410. Within MLPFS 2000, ORRI Asset Exchange 180 applies criteria to determine the maximum extent of possible arbitrage for assets EPM 500 and ENPM 600.

EPM 500 criteria is that the asset value after arbitrage must be greater than the market price of the asset. Asset exchange will not occur unless arbitage is possible. The output is the maximum producing ORRI arbitrage value for 100% ORRI which is coefficient A1 in the arbitrage transaction set forth below.

Figure 8:
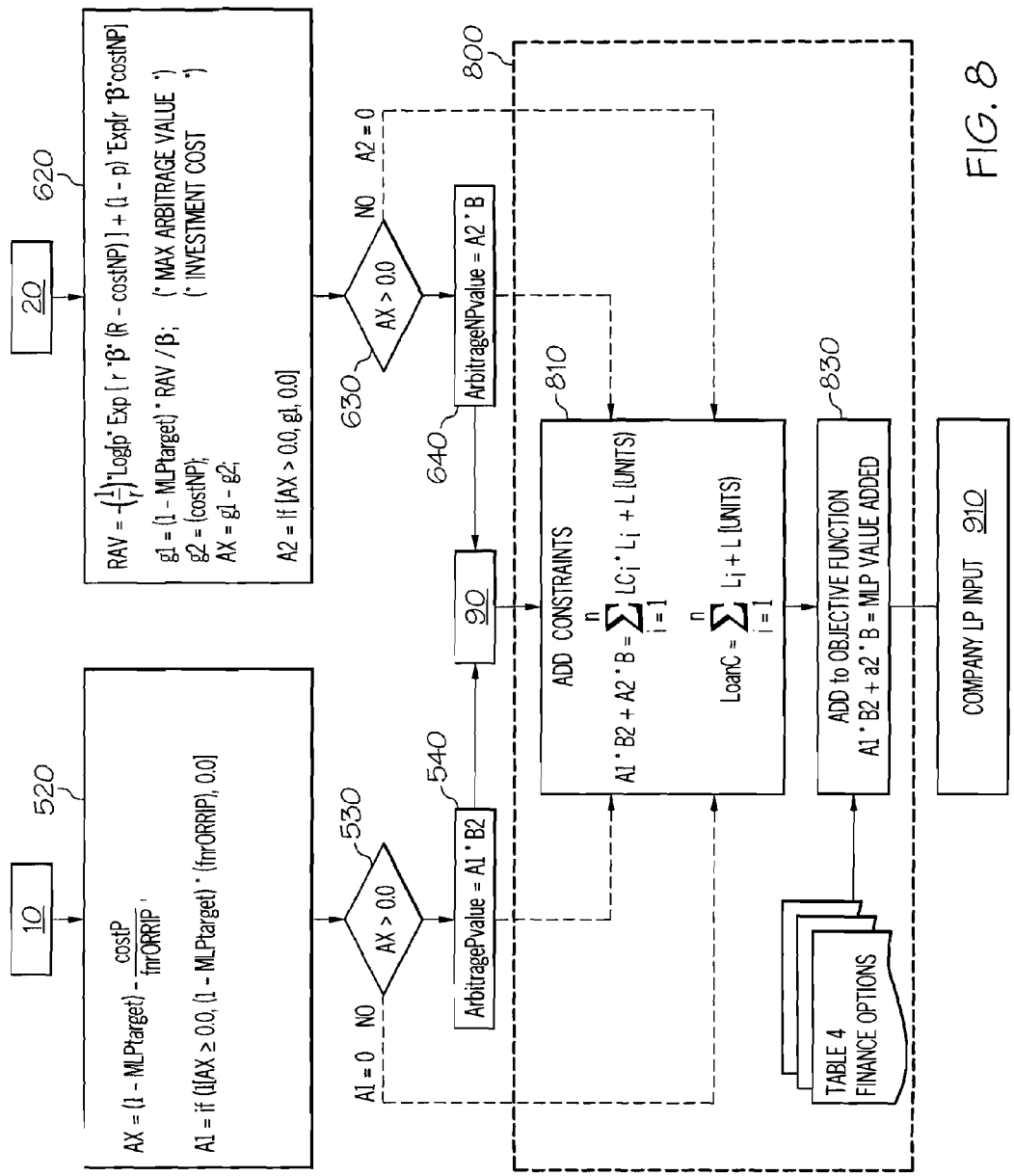
FIG. 8 is a continuation of FIG. 7 depicting LP constraints.
Figure 9:
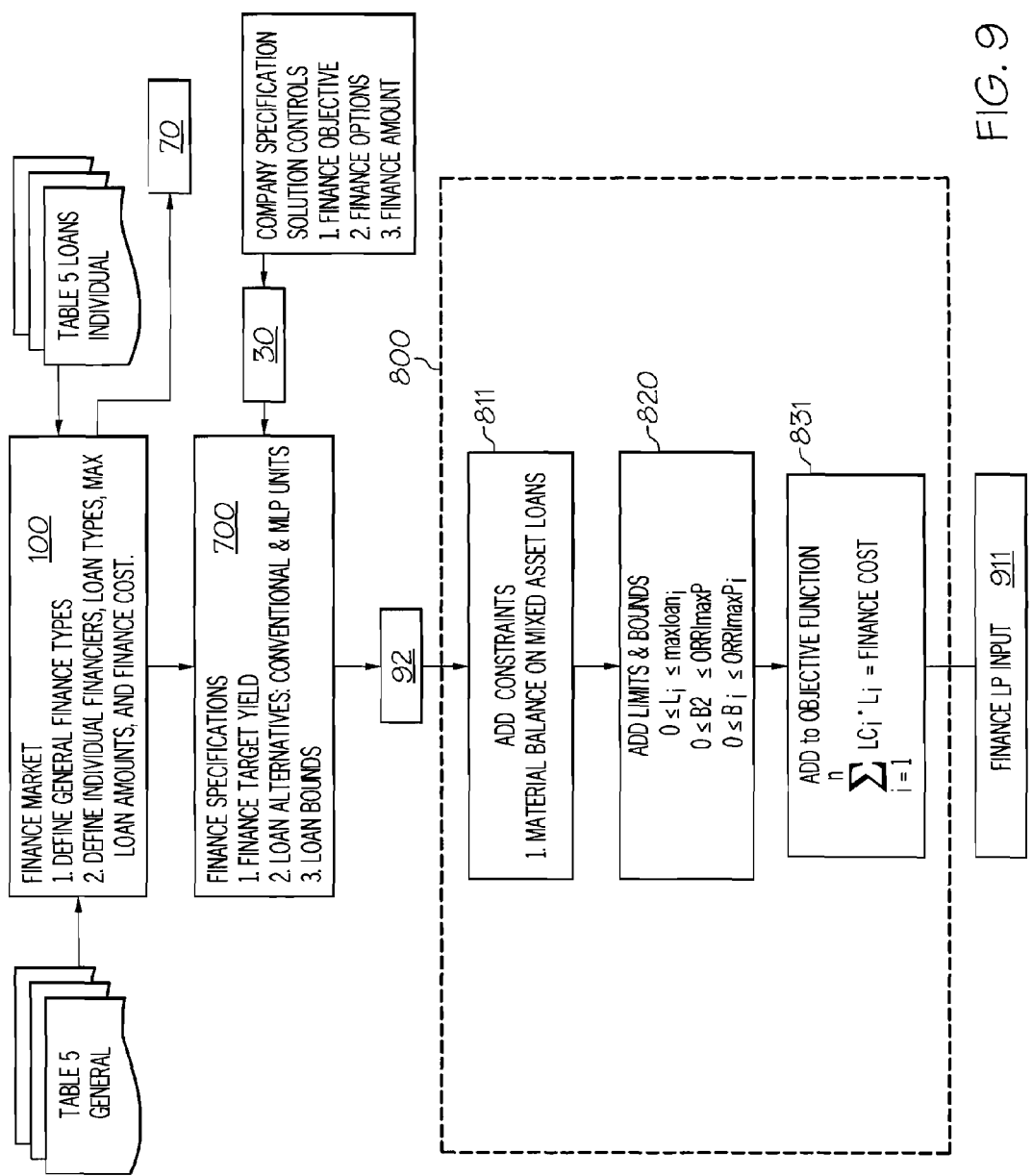
FIG. 9 is a continuation of FIG. 7 depicting finance contribution to LP constraints.
Figure 10:
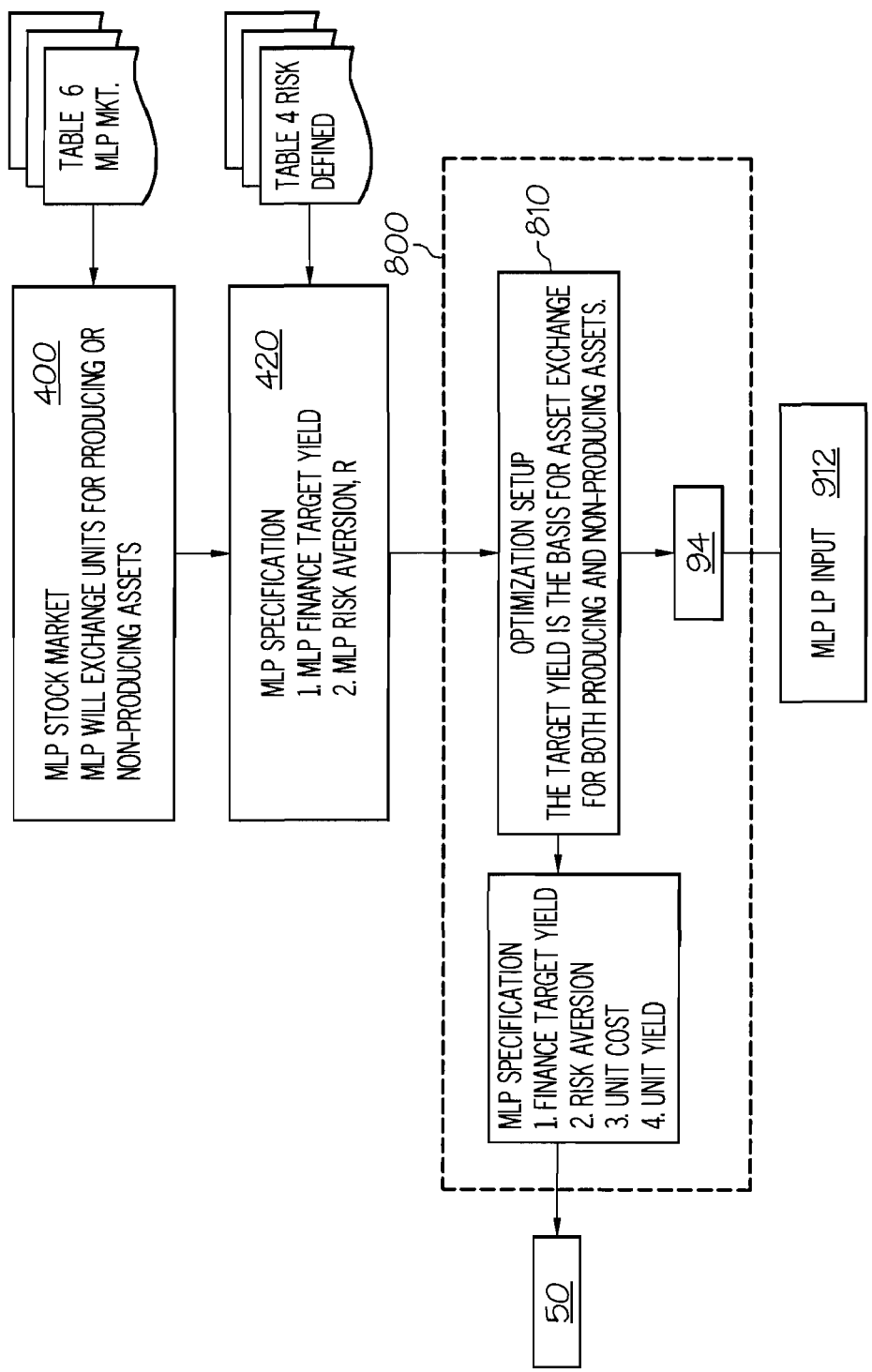
FIG. 10 is a continuation of FIG. 7 depicting MLP contribution to LP constraints.

Constraints of the system are specified as inequalitites characterizing the operational and market constraints of the company, the financier, and the MLP. Normegativity conditions are imposed on all variables and an objective function is defined as illustrated in FIG. 11A. The constraints, normegativity conditions and objective function are formated as input to the linear programming used in Optimization Solution 900. FIGS. 6, 8, 9, & 10 illustrate the contribution of Stock Market 400, EPM 500, ENPM 600, and Finance Specification 700 to transactions in OSU 800 for company 110, financier 150, and MLP 410. OSU 800 also adds system relationships, such as material balances as illustrated in FIG. 8, FIG. 9 and FIG. 10, which provide details of constraint generation.

Solution 900 is the execution and report of results of linear programming as illustrated in TABLE 12.

The Market Asset Pricing 1000 of Company Assets 112 in company asset market 120 including PM 200 and NPM 300 are illustrated as part of FIG. 3. Company 110 may be an individual, trust, corporation or other entity that is the legal owner of record of producing or non-producing mineral or royalty assets. For each asset, Company 110 has a revenue interest and an expense interest defined by the lease. A small part of the revenue interest may be converted to an over ridding royalty interest, (ORRI 130). If the company owns a mineral interest it is treated the same as an ORRI in the following. The ORRI receives a fraction of the gross income and pays no investment or operating expenses. The amount of ORRI that can be created by company 110 is usually limited to a few percent. Company 110 will value ORRI 130 according to the appropriate market (PM 200 or NPM 300). Company 110 desires to reduce risk and improve asset values by using MLPFS 2000 to enable financing. The company's decision to create an ORRI for asset exchange and the amount of ORRI created are subjective, but those facts are supplied to MLP 410 through required parameters defined in TABLE 3.

Market Asset Pricing 1000 of company assets 112 in company asset market 120, PM 200, and NPM 300 considers the entire package of assets to be financed. It is assumed that the company has chosen the assets to be included in the financier-company transaction and desired financial terms including the number and type of loans.

```
(* SETUP    *)
(* Loan Choices   *)
n = 1;          (* Conventional loans   *)
nn = 1;         (* Loans for MLP units  *)
```

The company has evaluated the assets using one or more evaluation techniques used throughout industry to arrive at the asset market price, yield, life, and risk. The asset evaluation results are summarized in TABLE 3 that is input to MLPFS 2000.

Figure 4:
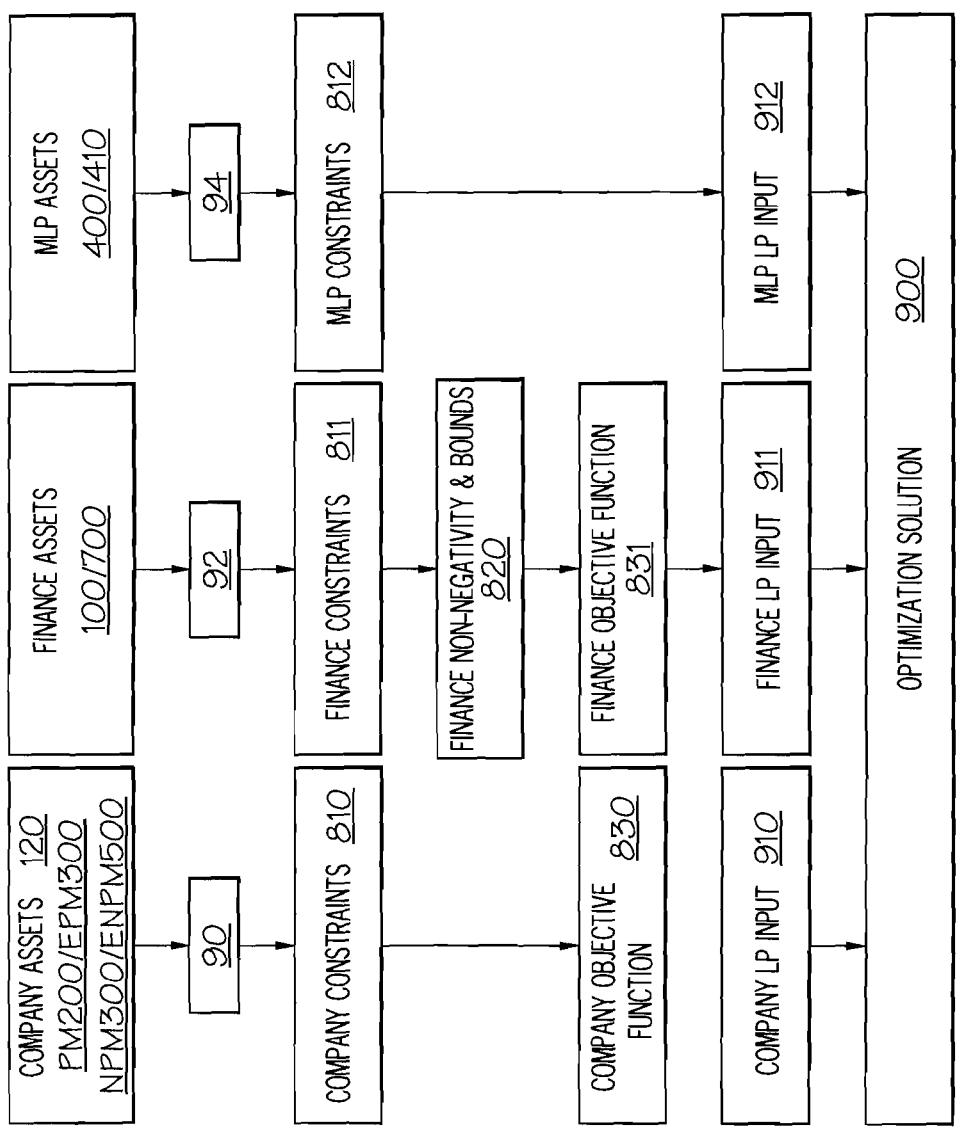
FIG. 4 depicts Components of the MLPFS.

Market Asset Pricing 1000 of NPM 300 assets only considers the revenue interest to be financed. High-risk non-producing assets generally cannot be financed, but mixed assets may be financed. The key to financing in the non-producing asset market is the control of risk. The company begins by creating a non-producing or wildcat ORRI interest and determines the ORRI market price, yield, life, and risk summarized in TABLE 4 which is submitted to OSU 800 for constraint construction as illustrated in FIG. 4.

ORRI Asset Exchange 180 NPM 300 is really more than one market because the same asset can have very different values to MLP 410 and to company 110 because the respective procedures for calculating value are different in the same market. Typically company 110 will use expected value whereas MLP 410 will risk adjust the value using risk aversion.

Market Asset Pricing 1000 for FM 100 provides two general constraints. The financial community will not finance non-producing assets or risky ventures, but will finance both non-producing and producing assets with MLP Units, such as Units 140. Each loan or financing activity has an associated financing cost.

FM 100 determines the current market conditions and financial constraints to be applied to the financing of company assets 112 by one or more financial entities such as financier 150 in FM 100 including, but not limited to, venture capitalists, banks, mezzanine financing, and others. Each financier is competitive in their own markets. In any transaction, the financial community wants their returns with a high degree of certainty, so most direct financing of assets involves assets in PM 200. Loans that are not asset based may be made to the company as corporate loans or unsecured loans. Finance management has set a minimum return on investment and a maximum tolerable risk for each acceptable financial transaction. Parts of the finance industry are highly regulated and such regulations impose constraints upon transactions.

FM 100 defines the financing alternatives in terms of financiers, loans, loan type, loan basis, loan limits, and financial target returns. A few of the general types of loans are shown in TABLE 1.

TABLE 1

| financetarget yield | Minimum yield for financing to occur |
| L[assetP] | loan for producing assets |
| L[corp] | loan for corporations |
| L[unsecured] | loan unsecured such as second mortgage |

The required information from FM 100 is shown in TABLE 9 illustrating the required variables and typical values from Example 1.

Market Asset Pricing 1000 of Units 140 in stock market 400 is illustrated in FIG. 3. Stock Market 400 is designed to provide value in several different markets. Units 140 are an exchange medium for mineral and royalty markets. MLP 410 is a publicly traded limited partnership composed of non-producing and revenue generating royalty and mineral interests. MLP Units are traded daily on the stock exchange of stock market 400 providing liquidity. MLP will only exchange Units 140 for ORRI 130 (overriding royalty interests and mineral interests). Both mineral and royalty interests in PM 200 and NPM 300 may be acquired with cash or asset exchange by MLP 410 and the revenues from production are distributed holders of Units 140 monthly.

Figure 6:
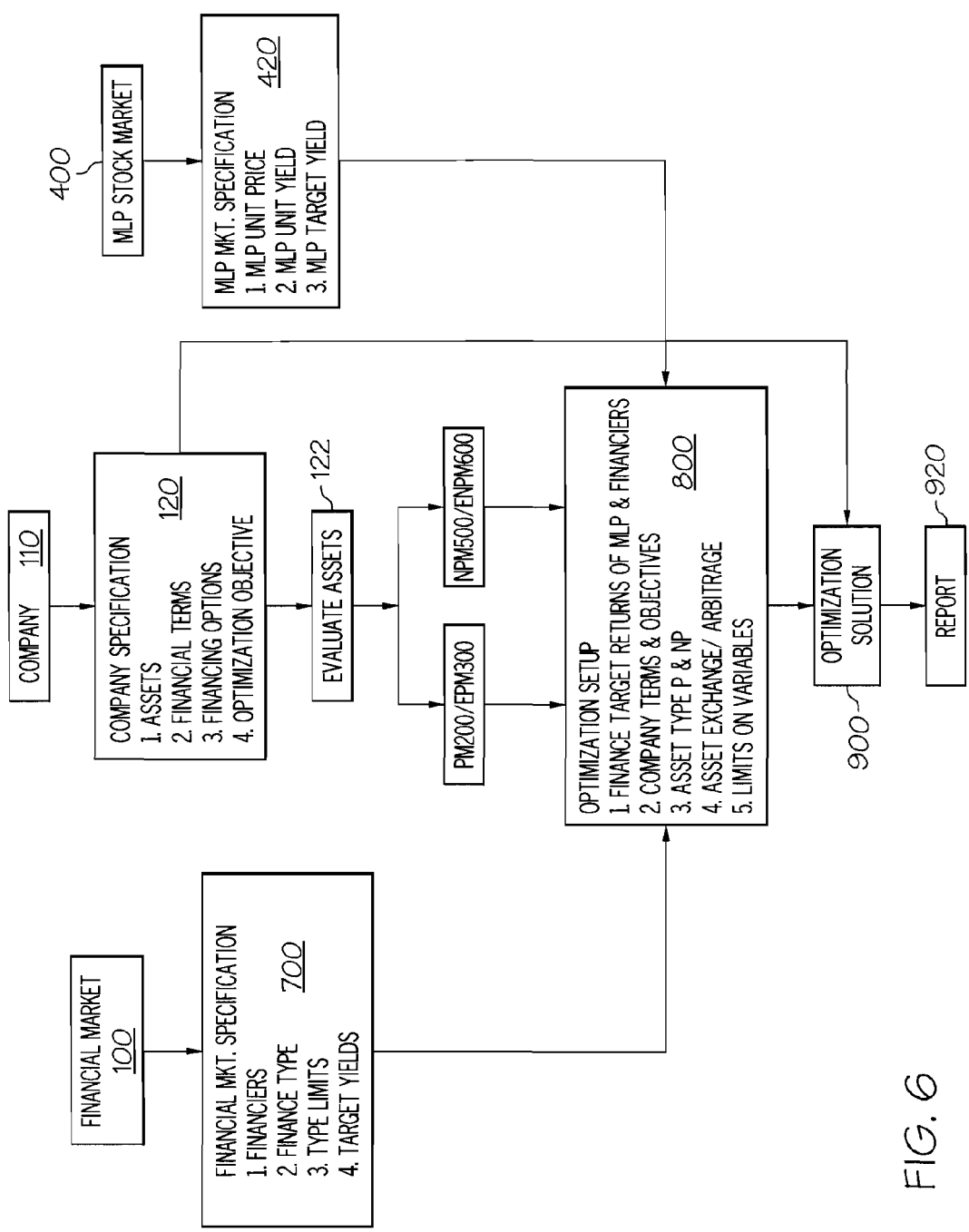
FIG. 6 depicts the interaction of MLPFS Components.
Figure 7:
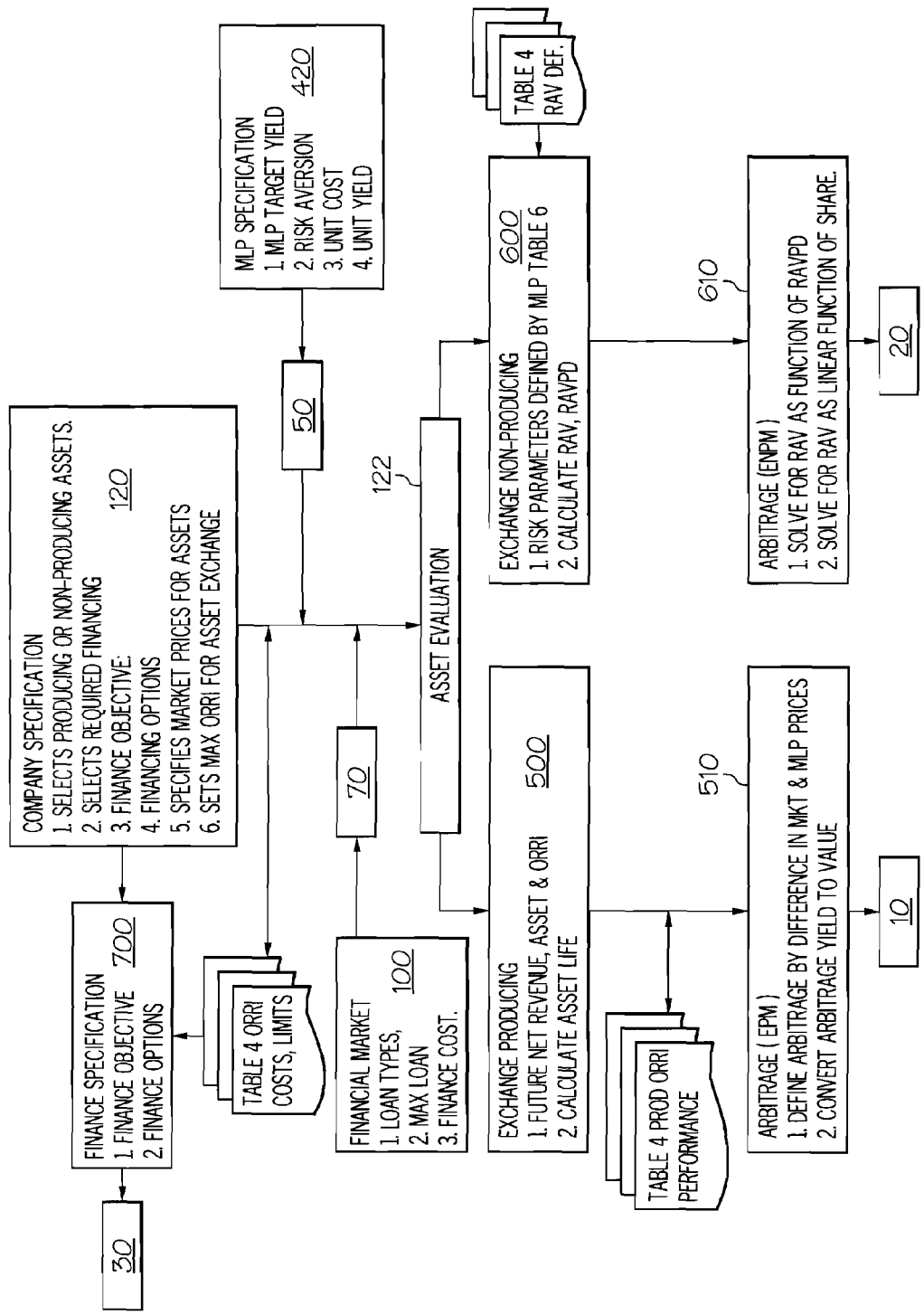
FIG. 7 illustrates the MLPFS components contributing to arbitrage for producing or non-producing assets.

MLP Stock Market 400, illustrated as part of FIG. 6, summarizes the market conditions and management financial objectives of MLP 410 for assets in both NP 200 that are the foundations of subsequent MLP 410 asset exchange decisions. Financial objectives, risk attitude, and stock market valuation of the MLP 410 variables are required input defined in TABLE 2.

TABLE 2

| MLPtarget | MLP target yield given by MLP management |
| MLPcost | stock market price of MLP unit |
| MLPunitdiv | dividend rate relating annual income to unit value |
| r | MLP risk aversion |

MLPFS 2000 depends upon how Units 140 are valued because Units 140 are exchanged with other markets as an integral part of MLPFS 2000. Central to the ideas of maximizing value is asset exchange where an asset in one market with one value and risk can be exchanged with another asset in another market with a quite different value. Asset exchange is a means of transforming value. Asset exchange between company 110 and MLP 410 allows the future value of an asset to be monetized as Units 140. The value Units 140 exchanged for ORRI 130 may further benefit from arbitrage between markets. The financial community considers Units 140 low risk because they have a known value in stock market 400 and because they are liquid. Units 140, exchanged for ORRI 130, are an asset class not subject to the same regulations and constraints as an ORRI that has not been exchanged for MLP Units which significantly increase the financing options. By asset exchange, the company has reduced the risk to the financial community by dedication of mixed assets (assets and MLP Units) to the financial transaction. The result is to improve the financial terms to the company, improve the financial communities' returns, reduce the financial communities risk, and create a new source of product for the MLP.

Figure 5:
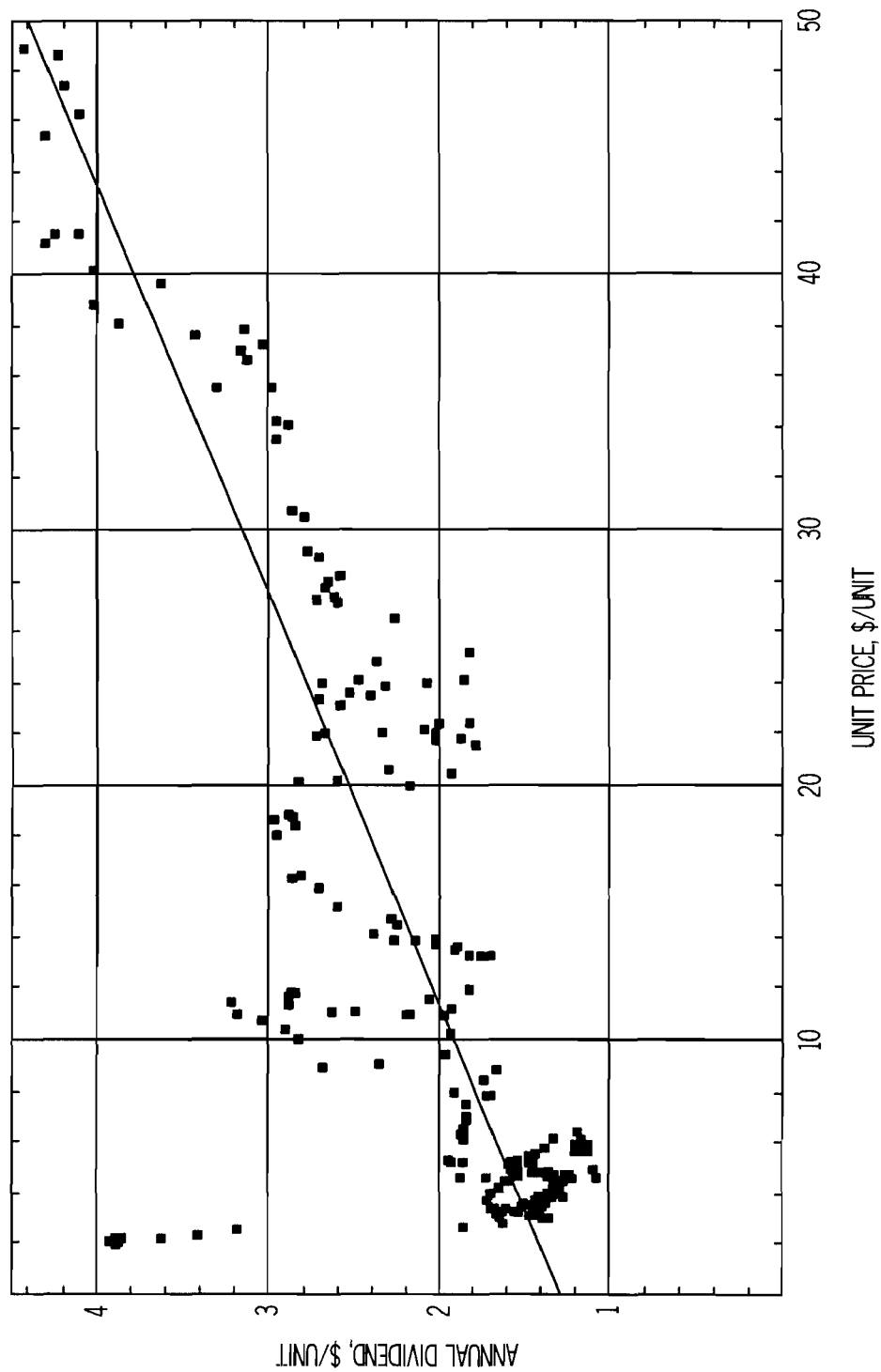
FIG. 5 illustrates historical stock market evaluation of Sabine Royalty Trust Units.

As an example of how MLP Units are valued by the market place consider Sabine Royalty Trust which is composed entirely of producing mineral and royalty interests and is the oldest MLP. Furthermore, Sabine is limited to mineral or ORRI interests and is prevented from buying or acquiring properties by its prospectus. Sabine is a declining asset and would not be expected to be considered a perpetuity. However, the twenty-year history (1987-2007) of Sabine makes the point quite clearly as shown in FIG. 5 where a plot of annual dividends versus unit price is a linear plot. The data source for both unit price and dividend histories is http://finance.yahoo.com/. The Current Yield as a function of unit price over Sabine's life as shown by the straight line. For there to be a fixed relationship between annual revenues and Sabine's unit price in the stock market, the market is valuing Sabine as a perpetuity. The linear relationship is quite remarkable considering that there has been a tenfold increase in prices over Sabine's history and a decline in the produced volumes of both oil and natural gas. The market place assigns no unit value below $1.00 per unit because Sabine would be de-listed from the NYSE below a value of $1.00 per unit.

With the introduction of the Market Asset Pricing 1000 for the Stock Market 400, MLP 410's financial goals and stock market performance of Units 140 are defined in TABLE 2.

By analogy with Sabine, the MLP unit market price has a fixed relationship between the unit dividend and unit market price. The relationship is a perpetuity and the proportionality constant is the internal rate of return of the perpetuity. The MLP will exchange assets for both producing and non-producing ORRI. The MLP will exchange assets which enables financing where none existed before. Conventional financing is expanded in Finance Specification 700 to include the mixed asset loan.

"Future Net Revenue," FNR, for royalties and minerals is the Future Gross Revenue minus production taxes. Production taxes are set to zero to simplify illustrations in the following. "Investment Yield" is the cost of an investment divided by the future net revenue of the asset. "MLP Target Yield" is the fraction of the future net revenue of an asset attributed to the MLP divided by the future net revenue. "MLP Target Yield" is the required return over the project life specified by MLP management for asset exchange to be executed. "Finance Target Yield" is the fraction of the future net revenue of an asset attributed to the financier divided by the future net revenue. "Finance Target Yield" is the required return over the project life as specified by finance management for financing to occur.

As stated above, "Yield" is the return over the life of an asset minus the investment and that quantity divided by the future net revenue expressed as a dividend rate. Herein "Yield" is the same as ROI. The term comparable to Yield in risky investments is the Risk Adjusted return per dollar, "RAVPD." "Yield to Maturity" is the discount rate that equates the present value of a equities cash flows with specified dividend and term, to the current market price; i.e., the internal rate of return for cash flows provided by the equity with a finite life. "Perpetuity" is an equity instrument that pays a fixed dividend rate and has no maturity. The dividend rate of a perpetuity equates the present value of the equities infinite cash flows to the current market price; i.e., the dividend rate is the internal rate of return of equity cash flows.

FM 100 inputs the financial goals as a target yield which is a constant. The finance target yield is a simple return on investment specified by finance management which may consider the time value of money over the project life. See TABLE 1 for required input variables.

Company 110 evaluates PM 200 assets, establishes desired loan amount, LoanC, and financial terms prior to considering the MLP Financing System as summarized in TABLE 3.

TABLE 3

| | |
|---|---|
| LoanC | Company requested loan amount |
| obj | Objective of optimization (max, min) |
| option1 | Option flag, finance option |
| ORRImaxP | Maximum producing ORRI to be used in asset exchange |
| ORRImaxNP | Maximum non-producing ORRI to be used in asset exchange |
| β2 | P, Share of producing ORRI used for asset exchange for MLP units |
| β | NP, Share of ORRI used for asset exchange for MLP units |
| fnrORRIP | Future Net Revenue of producing ORRI |
| costP | Producing market price of producing ORRI |
| p | NP, Probability of success |
| R | NP, Best possible Future revenues |
| costNP | Non-Producing market price of non-producing ORRI |

It is assumed conventional financing failed to meet the company's financing goals. In response, the company considers the financial options available with MLP financing, creates and specifies the maximum ORRI to be used in asset exchange, evaluates the ORRI, and establishes its market price. Hence, ORRI used in MLP asset exchange constraints are inequalities stating that the ORRI variable must be less than or equal to a specified maximum value. The company's contribution to transaction constraints for financing and asset exchange with parameters defined in TABLE 3 are:

| | | |
|---|---|---|
| Constraint 1: | loanC = | required financing amount |
| Constraint 2: | β2 ≤ | ORRImaxP |
| Constraint 3: | β ≤ | ORRImaxNP |

The company's financing objectives, loan options, producing and non-producing asset evaluation, market prices, and risk are illustrated with typical input values in Example 1 and TABLE 8.

Arbitrage is the difference in prices for a specific asset in different market. Hence, buying in one market and selling in another market can generate a profit. The producing arbitrage yield is defined by the difference in company market price versus the MLP market price. The company sets the asset market price as a fraction of future net revenue, say 0.6. So, any price offered by the MLP that is equal or greater than 0.6*FNR is a potential sale or asset exchange. The MLP is only interested in yield, say 0.12*FNR over the asset life. The value to the MLP is (1−0.12)*FNR=0.88*FNR. Arbitrage is the price difference $$0.88*FNR - 0.60*FNR = 0.28*FNR$$

which is what the MLP is willing to pay over the company's market price. That is, the MLP is willing to pay 0.88/0.6=1.467 times the company's producing market price for the ORRI. A criteria for asset exchange is that the total asset yield is greater than the sum of the MLP requirements and the cost. Variables are defined in Table 2 and Table 3. (Although not specified, costP and fnrORRIP generally refer to a 100% interest, but if not 100%, then they both refer to the same interest.)

$$AX = 1 - MLPtarget - costP/fnrORRIP$$

The maximum value of the producing ORRI is specified by coefficient A1, for β2. The A1 coefficient in the LP formulation of producing asset arbitrage is non-negative, but only has a real value if asset exchange is possible. That is, if the quantity AX is greater than zero, then A1 is the maximum value of future net revenue that the MLP is willing to pay for the asset.

---
(1 − MLPtarget)*( fnrORRIP),
otherwise A1 has a value of zero.
If AX greater than 0.0, then A1 = (1 − MLPtarget)*fnrORRIP,
Else
If AX less than or equal to 0.0, then A1 = 0.0.

---

Market Asset Pricing 1000 NPM (300) assets values a nonproducing asset by expected values, but Stock Market 400 bases their decisions upon risk Adjusted Value, RAV, from exponential utility theory which discounts for risk according to the MLP's risk aversion, r. The MLP value of the nonproducing ORRI depends upon the asset risk provided by the company for the following variables defined in TABLE 4.

TABLE 4

| | Variable Name | Description |
|---|---|---|
| 1 | r | MLP risk aversion |
| 2 | R | Best possible Future revenues |
| 3 | C | NonProducing market value and MLP cost of NonProducing asset |
| 4 | β | Share of ORRI used in non-producing asset exchange for MLP units |
| 5 | P | Probability of success |

The risk adjusted value for this simple lottery is calculated from:

$$RAV = -\left(\frac{1}{r}\right) * \text{Log}[p * e^{-r*\beta*(R-C)} + (1-p)*e^{r*\beta*C}]$$

The simple return on investment decision criteria can be used to discount for both probability and risk aversion to provide an important decision tool for management, RAVPD, the risk adjusted value per dollar is
The RAVPD has some special properties that allow management to maximize their returns while $$RAVPD = \frac{RAV}{\beta * C}$$

minimizing their costs. The best return on investment that can be achieved is found at very small shares where the investor is able to diversify and achieve the expected return per dollar invested. In contrast, for risky projects the investment can become too risky for almost any investor. So, at some point the risk adjusted value per dollar, RAVPD, goes to zero at the maximum RAV. By selecting some share of the available ORRI, the target return can be achieved or exceeded, if the expected RAVPD exceeds the MLP target return. The different measures of risk adjusted return per dollar invested are summarized as follows:

| | Variable Name | Description |
|---|---|---|
| 1 | RAVPD | Risk Adjusted Value Per Dollar |
| 2 | EVravpd | Expected Value of RAVPD at share −>0 |

-continued

| | Variable Name | Description |
|---|---|---|
| 3 | bestβ | ORRI share, β, at RAV −> maximum, RAVPD −>0 |
| 4 | shareyield | RAVPD as linear function of share, β, from EVravpd to bestβ |

The RAVPD at a very small share is equal to the nonproducing asset yield expected value.

$$EVravpd = \frac{(p*(R-C)+(1-p)*C)}{C}$$

At the RAV maximum, the best share can be found by differentiating RAV and setting it to zero.

$$Best\beta = \left(\frac{1}{r}\right)*\left(\frac{1}{R}\right)*\text{Log}\left[\frac{p}{1-p}*\left(\frac{R}{C}\right)\right]$$

For the simple lottery characterization of risk, the nonproducing asset yield is closely approximated by a straight line between the expected yield value at share equal to zero, and the zero RAVPD at the best share (For example, see FIG. 16). The line equation for nonproducing asset yield as a function of nonproducing ORRI share is $$shareyield = -\frac{EVravpd}{best\beta}*\beta + EVravpd$$

The share of the ORRI that the MLP wants is where the shareyield, is equal to, or greater than, the MLP target yield.

Constraint 4: shareyield≧MLPtarget

The MLP producing ORRI yield at the selected share, β, is (610)

$$shareyield = -\frac{EVravpd}{best\beta}*\beta + EVravpd$$

To find the RAV at the selected share (610), since RAVPD=RAV/C and the cost at β is β*C $$RAV = RAVPD*\beta*C$$

$$RAV = \left(-\frac{EVravpd}{best\beta}*\beta + EVravpd\right)*\beta*C$$

Or, $$RAV = -(C*Evravpd/best\beta)*\beta^2 + EVravpd*\beta*C$$

Since β is usually less than 0.1 and β^2 is much less than 0.01 then RAV may be closely approximated for small shares by Constraint 5: RAV=+EVravpd*β*C The difference in value between the non-producing market price, which is based upon expected value, and the Risk Adjusted Value, which is the value of the asset to the MLP, is the arbitrage value 620. Asset exchange for non-producing assets will take place, if and only if, RAV is greater than the cost 630. Then the test for asset exchange is given by 640

If RAV ≧ costNP, then A2 = RAV,
Else
  If RAV < costNP, then A2 = 0.0
  With the nonnegativity condition
    A2 ≧ 0

The use of exponential utility theory herein is used as a convenient analytical expression of how risk and risk aversion influence decisions in risky investments. However, there are other techniques such as Monte Carlo Simulation, Value At Risk, and others that are commonly used within industry that could be readily substituted for exponential utility theory to accomplish the same analysis.

The financial transaction can now be updated by adding the MLP Units from both producing and non-producing asset exchange to maximize mixed asset financing revenues 810. The finance revenues include the return of the loan Principle and the cost of financing. For the general case, the cost of financing is based upon the financial target returns for each type of loan considered as part of the possible financing package. For the simple cases presented here, only one finance target yield is considered, so the cost of financing can be based upon the loan amount as specified by the company, loanC. The finance yield is then Finance yield=(finance revenues−loanC)/loanC For financing to occur the Finance yield must meet or exceed the Finance target yield.

If Finance yield≧Finance target yield, then financing is feasible.

If Finance yield<Finance target yield, then financing is not possible.

Since the Finance target yield and loan amount are constant, the financial transaction as an inequality are rearranged to finance revenues≧(1+Finance target yield)*loanC The transactions for financing of debt involving either producing or non-producing assets is illustrated assuming loan types secured and unsecured. The arbitrage values for producing and non-producing assets must provide a new asset for a loan against the MLP Units as collateral to meet any shortfalls in conventional financing and pay all financial costs if that is a finance option selected by the company. Transaction would be that all loans and arbitrage values must equal all loan principle plus financial costs.

Secured+unsecured+$A1*\beta2+A2*\beta$≧(1+Finance target yield)*loanC

Substituting for A1 and A2:

Secured+unsecured+(1−MLPtarget)*fnrORRIP*β2+
  (EVravpd−1)*C*β ≧ (1+financetargetyield)
  *loanC Where
A1=(1−MLPtarget)*fnrORRIP
A2=(EVravpd−1)*C
A3=(1+financetargetyield)
Where A1 is the maximum arbitraged value of the producing ORRI, A2 is the maximum value of the non-producing ORRI, and A3 is total loan return on investment required for financing. The loan values for both secured and unsecured are assumed known and constant. The financing terms are collected on the left hand side of the equation Constraint:$A1*\beta2+A2*\beta−(A3*loanC−Secured−unsecured)$≧0

In words the transaction now reads (value from Asset Exchange & Arbitrage)−(all financing returns)≧0

Where "all financing returns" includes the additional collateral required and all financing costs.

This transaction form is readily expanded to include several members of the financial community with each servicing a different type of loan and each entity represented by one or more transactions. The financial term for a specific loan type, L1, with financial cost LC1, becomes $F1=LC1*L1$ Where LC1 is the finance target yield for loan L1. The financial costs for each loan sum to the total financial cost.

$F1+F2+F3+\ldots$=total financial cost

Constraint:$LC1*L1+LC2*L2+LC3L3+\ldots$
  $LCnLn$=total financial cost

Total loan value of loans i thru n $$\sum_{1=n+1}^{n} L_1 = \text{conventional financing}$$

Total loan value based upon MLP Units, loans n+1 to nn, is given by $$\sum_{1=n+1}^{nn} L_1 = mlploans$$

Financial cost, LCi, of both conventional loans, L1, and MLP loan, Li, financing is the total financial cost.

conventional+ MLPfinancing= total financing cost $$\sum_{i=1}^{n} LC_i * L_1 + \sum_{i=n-1}^{nn} LC_1 * L_1 = \text{total financing cost}$$

$$A1*\beta2 + A2*\beta = \sum_{i=n+1}^{nn} L_1$$

For the option of MLP Units to pay no financial costs, the value of the MLP Units is equal to the loans using MLP Units as collateral.=

For the option of MLP Units to pay all financial costs, the value of the MLP Units must equal the loans using the MLP Units as collateral plus the financial cost of the MLP Units, plus the financing cost of all other loans.

$$A1*\beta2 + A2*\beta = \sum_{i=n+1}^{nn}(1+LC_1)*L_1 + \sum_{i=1}^{n} LC_1 * L_1$$

$$A1*\beta2 + A2*\beta = \sum_{i=n+1}^{nn} L_1 + \sum_{i=1}^{n} LC_1 * L_i + \sum_{i=n+1}^{nn} LC_1 * L_1$$

Or

The transactions when expressed as constraints for multiple loan types and multiple financiers with the MLP Units paying all financial costs includes the arbitrage constraint, material balance on loans, and variable bounds as generalized and illustrated as a coeffficint matrix in TABLE 5, a set of constraints in TABLE 6, and input to the linear programming software in TABLE 7.

TABLE 5

COEFFICIENT MATRIX

| A1 | A2 | −LCunit1 | −LC1 |
|---|---|---|---|
| 0 | 0 | 1. | 1. |
| 0. | 0. | 1. | 0. |
| 0. | 0. | 0. | 1. |
| 1 | 0. | 0. | 0. |
| 0. | 1 | 0. | 0. |
| 1. | 0. | 0. | 0. |
| 0. | 1. | 0. | 0. |
| 0. | 0. | 1. | 0. |
| 0. | 0. | 0. | 1. |

The coefficient matrix presents the coefficients of previously defined variables as they appear in linear constraints. TABLE 6 provides the actual constraints, type of constraints, and right hand side variables.

TABLE 6

| | | |
|---|---|---|
| A2 β + A1 β2 − $L_1$ $LC_1$ − $L_2$ $LC_2$ − (L[unit])$_1$ | EQ | 0. |
| $L_1$ + $L_2$ + (L[unit])$_1$ | EQ | LoanC |
| $L_1$ | LT | maxloan$_1$ |
| $L_2$ | LT | maxloan$_2$ |
| L[unit] | LT | maxLunit |
| β2 | LT | ORRImaxP |
| β | LT | ORRImaxNP |

TABLE 7

Objective
LC1 = LCunit1
Coefficients
{{A1, A2, −LCunit1, −LC1}, {0, 0, 1., 1.}, {0., 0., 1., 0.},
 {0., 0., 0., 1.}, {1, 0., 0., 0}, {0., 1, 0., 0.}, {1., 0., 0., 0.),
 {0., 1., 0., 0.}, {0., 0., 1., 0.}, {0., 0., 0., 1.}}
RHS
{{0., 0}, {LoanC, 0}, {maxloan1, −1}, {maxloan2,−1},
 {ORRImaxP, −1}, {ORRImaxNP, −1}, {0., 1}, {0., 1}, {0., 1}, {0., 1}}

Financing costs are given for specific finance activites, but loan packages may be a lower cost alternative because financiers can structure the loans to their particular circumstances. However, the more complicated case does not illustrate anything new in terms of Asset Exchange, or Arbitrage and is omitted for simplicity.

The company's goal with MLP Financing System is to enable financing or minimize financial costs. The objective function (830) defines the company's cost with respect to each of the transaction activities. The optimization objective is assumed to be minimization of financing costs for purposes of illustrating optimization within the MLP Financing System.

The financing costs for the company includes the profit from asset exchange and arbitrage, and the interest on all of the loans. The MLP paid A1*β2 for the producing ORRI and A2*β for the non-producing ORRI which collateralized a loan on MLP assets and paid all interest costs.

Company interest cost=$\Sigma LCi*Li$ (* For all loans*)

Company collateral cost=LUnits

Then the company's total financial cost is

Company Finance Cost=+$A1*\beta2+A2*\beta-\Sigma LCi*Li-LUnits$

Objective function 830, minimize company's financial cost with MLP paying all financial costs.

MINIMIZE: +$A1*\beta2+A2*\beta-\Sigma LCi*Li-L$Units

A very crude LP matrix generator is shown in Mathematica code, FIG. 11A & 11B, to illustrate how the objective function, constraints, equation type, and right hand side are generated and reduced to input to the Mathematica LinearPrograming function for solution.

(* LinearProgramming LinearProgramming [obj, coefmat, rhs] finds a vector χ which minimizes the quantity obj *χ subject to the constraints coefmat.χ≧0. *)
LinearProgramming[obj, coefmat, rhs]

The purpose of FIG. 11A &11B, is to provide a simple system to give the user enough information to adapt the MLP Financial System to any number of very fine commercial Linear Programming packages available with very sophisticated matrix generators and post processing analysis techniques.

Three example applications are presented which provide different views of MLPFS 2000 and illustrate that the MLPFS 2000 concepts can be employed by anyone versed in the art to a wide variety of financing situations. MLPFS 2000 benefits include: risk reduction, monetization, arbitrage, creation of a new asset class not subject to petroleum finance regulations, and liquidity. The relative contribution of these benefits depends upon the size and risk of the assets. Very high-risk assets benefit by risk reduction and creation of a new asset class. Large low risk assets benefit largely from monetization, arbitrage, creation of a new asset class, and liquidity.

Example one is a very a simple market where cash is the only consideration of value and there is no risk. Improving value through arbitrage, creation of a new asset class, and providing liquidity are the keys to financing in this market. MLPFS 2000 increases the amount of financing possible and lowers the cost of financing. This example provides simple illustrations of market asset evaluation, arbitrage, and MLPFS 2000. The conditions for asset exchange are illustrated, arbitrage is defined, the asset benefits from arbitrage, and the financial objectives of both the MLP, such as MLP 410, and the financier, such as financier 150, influence the final contribution of the MLP to the financial value. The improvement in value to the company, MLP, and financier are briefly summarized.

Example two is extremely high risk and is typical of petroleum exploration with its own markets and evaluation techniques. Controlling risk and liquidity are the keys to transactions in this market. The risk is so high that that the financial community will not finance the assets, but will finance the MLP Units after an asset exchange has taken place. Asset exchange and the creation of a new asset class by the MLP may be the only financial activities in this market, but they are essential to any subsequent activity by the financial community. The improvement in value to the company, MLP, and financier are briefly summarized.

Example three is typical of petroleum producing assets markets with moderate to low risk where arbitrage, creation of a new asset class, and liquidity all contribute to the extent and cost of financing. The improvement in value to the company, MLP, and financier are briefly summarized.

In Example 1, the company wants a loan to acquire a single declining producing asset. It is a very simple market where prices are constant, cash is the only consideration of value, there is no risk, and the market price of the asset is a simple fraction of the future net revenue. Improving value through arbitrage, creating a new asset class for financing, and providing liquidity is the key to financing in this market. This market lends itself to a simple linear programming model for illustrating MLPFS 2000 concepts. This example also illustrates that asset exchange requires a set of transactions that must be executed together. When executed individually, the required transactions for the MLPFS 2000 are not all spontaneous and the benefits can not be realized.

Market Asset Pricing 1000 of PM 200 assets considers that the company has identified a set of producing assets and approached financiers 100 for conventional financing, but failed to secure financing. In response, Company has specified the loan amount, the extent of ORRI to be used in asset exchange to enable or enhance financing and certain loan options for PM 200 assets and EPM 300 assets. The producing market value of producing assets and producing ORRI has been established.

Company 110 evaluates the EPM 300 assets that have Future Net Revenue (FNR) of 10.0 million dollars. Company 110 wants 100% financing of 0.5 million dollars. Company 110's desired loan terms, the physical characteristics of the Company's assets, and producing market conditions are summarized in Table 8.

TABLE 8

| Variable | Value | Description |
| --- | --- | --- |
| LoanC | 0.5 | Company requested loan amount |
| obj | min | Objective of optimization(max, min) |
| option1 | 1 | Option flag, finance options |
| ORRImaxP | 0.05 | Maximum producing ORRI to be used in asset exchange |
| ORRImaxNP | 0. | Maximum non-producing ORRI to be used in asset exchange |
| β2 | Null | P, Share of producing ORRI used for asset exchange |
| β | 0. | NP, Share of ORRI used for asset exchange for MLP |
| γ | 0.6 | Purchase price as fraction of FNR for producing ORRI |
| fnrORRIP | 10. | Future Net Revenue of producing ORRI |
| costP | fnrORRIPγ | Producing market price of producing ORRI |
| p | 0. | NP Probability of success |
| R | 0. | NP Best possible Future revenues |
| costNP | 0. | Non-Producing market price of non-producing ORRI |

The cost of financing including interest and MLP Units is to be minimized and entirely paid for by ORRI asset exchange 180.

Market Asset Pricing 1000 of financing producing assets in Finance Market 100 provides a list of financier's loans, the minimum target yield for each financier, cost of financing for each loan, and the maximum amount that can be loaned for each asset type. Finance Market 100 market conditions are summarized in Table 9.

TABLE 9

| Variable | Value | Description |
| --- | --- | --- |
| Financetargetyield | 0.12 | Minimum yield for financing to occur |
| LassetP | 0. | loan for producing assets |
| Lcorp | 0.8 LoanC | loan to corporations |
| Lunsecured | 0. | loan unsecured such as second mortgage |
| LCunit1 | 1 + financetargetyield | loan for MLP units |
| LCI | financetargetyield | Corporate loan |
| maxloan1 | 0.2 LoanC | Maximum loan for MLP units |
| maxloan2 | 0.8 LoanC | Maximum corporate loan |

Market Asset Pricing 1000 of Units 140 in stock market 400 define the target yield for either ORRI assets in PM 200 or EPM 300 which are to be exchanged for Units 140. MLP 410 risk aversion level is also defined so that non-producing asset values can be established for the MLP. Finally the stock market performance of the MLP is defined in terms of current unit prices and annual dividends. These parameters are summarized in TABLE 10.

TABLE 10

| Variable | Value | Description |
| --- | --- | --- |
| MLPtarget | 0.12 | MLP target yield given by MLP management |
| MLPcost | Null | stock market price of MLP unit |
| MLPunitdiv | 0.06 | dividend rate relating annual income to unit value |
| r | 0. | MLP risk aversion |

Input to the Linear Programming function generated at OSU 800 is illustrated in TABLE 11.

TABLE 11 objfun = {0.0, 0.0, 0.12, 0.12}
Coefficients
{{8.8, 0., −1.12, −0.12}, {0, 0, 1., 1.}, {0., 0., 1., 0.},
{0., 0., 0., 1.}, {1, 0., 0., 0.}, {0., 1, 0., 0.}, {1., 0., 0., 0.},
{0., 1., 0., 0}, {0., 0., 1., 0.}, {0., 0., 0., 1.}}

TABLE 11-continued

RHS
{{0., 0}, {0.5, 0}, {0.1, −1}, {0.4, −1},
{0.05, −1}, {0., −1}, {0., 1}, {0., 1}, {0., 1}, {0., 1}}

Asset exchange and arbitrage value are computed as:

```
(*    ************************************    *)
(*         Producing ORRI Arbitrage Value     *)
(*    ************************************    *)
```

```
costP        = 0.6 * fnrORRIP,
ORRIyield    = (fnrORRIP − costP)/costP;
    (*      ASSET EXCHANGE CRITERIA      *)
```

$$AX = (1 - MLPtarget) - \frac{\cos}{fnrORRIP};$$

```
A1 = If [AX > 0, (1 − MLPtarget) * (fnrORRIP), 0.0]
    (*    ****************************************    *)
    (*           Non-Producing ORRI Arbitrage Value    *)
    (*    ****************************************    *)
A2 = 0.0;
```

The optimum solution is shown in Table 12.

TABLE 12

```
(*    ****************************************    *)
(*              OPTIMIZE SOLUTION                  *)
(*    ****************************************    *)
LinearProgramming [objfun, coefmat, rhs]
{0.0181818, 0., 0.1, 0.4}
    where
    β2          =       0.0181818
    β           =       0.0
    Lunit       =       0.1
    Lasset      =       0.4
```

Checking the solution, the financing required 0.1 million dollars of MLP Units for collateral plus 0.06 million in finance costs for a total cost of $160,000 dollars. These dollars required 0.0181818 of the total arbitrage value available from asset exchange. The cost of the ORRI is 0.6*0.5=0.3 million and the exchange ratio is 0.88/0.6=1.46667 so the total arbitrage value of the 5% ORRI is 0.3*1.46667=0.440 million (0.160/0.440)*0.05=0.01818181 ORRI which exactly agrees with the LP solution of 0.0181818 for β2.

The 100% arbitrage value, A1, computed as input to the LP matrix was 8.8 million which is checked by 0.440/0.05=8.80 million Finally the total loan amount of 0.5 should have been divided into 0.4 for the asset loan and 0.1 for the MLP Units loan which is confirmed in the LP solution.

At Solution 900, OSU 800 was not required to solve this simple financial example. Financial cost to the company for 100% financing of 0.5 million for acquisition of risky asset is only 1.818% ORRI. Arbitrage by asset exchange has increased the value of the ORRI by 47% in MLP Units and added value to all parties in the transaction. The Financier earns a 12% yield on the transaction and the MLP earns a 12% yield on the transaction that meets or exceeds their respective target yields. After payout of the loan the company owns 0.1 million of unencumbered MLP Units.

The second example considers High Risk Non-Producing Assets providing financing for the early stages of exploration and drilling. This high-risk case is a wildcat well where the producer would like to finance the acreage cost. Since there is no production, this is very high risk. The key to financing in the Non-Producing assets exploration market is the control of risk and increasing value by exchange of assets for arbitrage between the exploration market and the stock market.

At ORRI NPM 500 the Company wants a 1.0 million dollar wildcat acreage loan. A loan will be made on a "mixed asset" involving a loan to the corporation plus the low risk MLP Units as part of the collateral. The MLP wants the highest yield possible. The objective then is to maximize the MLP yield and satisfy all other constraints for financing. The financier wants 15% yield overall. The financier will loan 75% of the loan cost to the corporation, and the MLP Units must make up the remaining 25% of the total loan collateral.

At ORRI NPM 500, The Company's Non-Producing ORRI Asset evaluation process begins. The company elects to carve out a wildcat ORRI of up to 10%. The subject wildcat has an estimated FNR to the company of 30.0 million dollars. The ORRI upside potential is twice the working interest income and is a FNR of 60.0 million to 100% of the revenue interest. The dollars at risk are acreage and dry hole costs of 2.0 million dollars. By market conventions, the wildcat ORRI cost for this well for 100% of the revenue is twice the 2.0 million dry hole costs. The probability, p, of success is 20%.

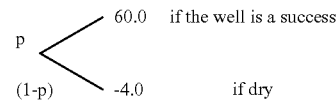

Figure 12:
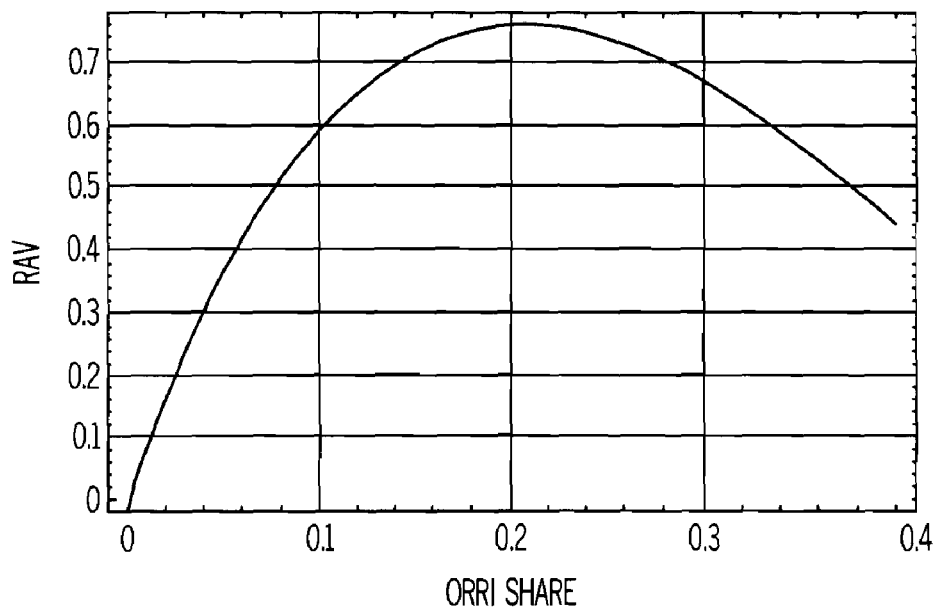
FIG. 12 depicts an exemplary Risk Adjusted Value, RAV, versus ORRI Share graph.
Figure 13:
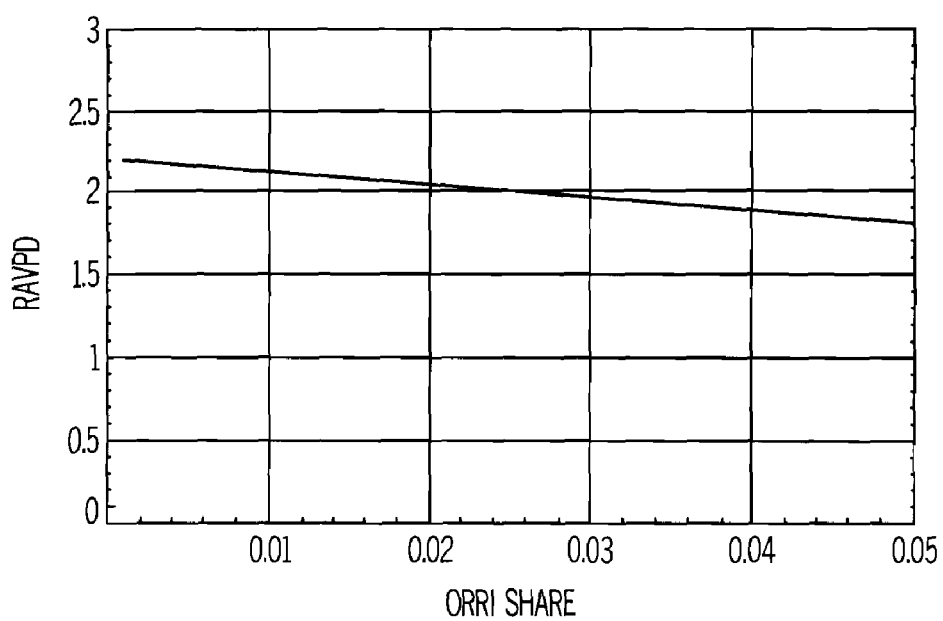
FIG. 13 depicts an exemplary Risk Adjusted Return per Dollar versus ORRI Share graph.

For this risk relationship, the Risk Adjusted Value as a function of the ORRI is shown in FIG. 12, and the Risk Adjusted Value per Dollar is shown in FIG. 13.

The ORRI is used in an asset exchange for MLP Units for both collateral and finance costs. Loan options are:

```
(*      SETUP       *)
(*      Loan Choices    *)
n = 1;      (*      Conventional loans    *)
nn = 1:     (*      Loans for MLP units   *)
```

Required input parameters for the ORRI NPM 500 and ORRI ENPM 600 are summarized in TABLE 13, for the financier Finance Market (Assets Only) 100 and Finance Market (Assets+Units) 700 in TABLE 14, and for MLP Stock Market 400 in TABLE 15.

TABLE 13

| Variable | Value | Description |
| --- | --- | --- |
| LoanC | 1. | Company requested loan amount |
| obj | min | Objective of optimization(max, min) |
| option1 | 1 | Option flag, finance options |
| ORRImaxP | 0. | Maximum producing ORRI to be used in asset exchange |
| ORRImaxNP | 0.05 | Maximum non-producing ORRI to be used in asset exchange |
| β2 | 0. | P, Share of producing ORRI used for asset exchange |
| β | Null | NP, Share of ORRI used for asset exchange for MLP |
| γ | 0. | Purchase price as fraction of FNR for producing ORRI |
| fnrORRIP | 0. | Future Net Revenue of producing ORRI |
| costP | 0. | Producing market price of producing ORRI |
| p | 0.2 | NP Probability of success |
| R | 60. | NP Best possible Future revenues |
| costNP | 4. | Non-Producing market price of non-producing ORRI |

TABLE 14

| Variable | Value | Description |
|---|---|---|
| Financetargetyield | 0.15 | Minimum yield for financing to occur |
| LassetP | 0. | loan for producing assets |
| Lcorp | 0.75 LoanC | loan to corporations |
| Lunsecured | 0. | loan unsecured such as second mortgage |
| LCunit1 | 1 + financetargetyield | loan for MLP units |
| LCI | financetargetyield | Corporate loan |
| maxloan1 | 0.25 LoanC | Maximum loan for MLP units |
| maxloan2 | 0.75 LoanC | Maximum corporate loan |

TABLE 15

| Variable | Value | Description |
|---|---|---|
| MLPtarget | 0.15 | MLP target yield given by MLP management |
| MLPcost | 20. | stock market price of MLP unit |
| MLPunitdiv | 0.06 | dividend rate relating annual income to unit value |
| r | 0.1 | MLP risk aversion |

The company specifies the desired loan size and financing options. The number, size, and types of loans to be considered from the available loan possibilities in setting up the LP solution are specified. The financing option that the MLP Units will pay all financing costs is specified. Although MLP Units must be used for collateral to supplement the non-producing assets for loan purposes, since they are the result of asset exchange the MLP Units used for collateral are not considered an expense.

The LP input coefficient matrix, equation type, RHS values, and objective function are generated for Optimization Set-up 800 and illustrated in Table 16. All coefficients are defined. ENPM 600 and arbitrage defined by the coefficients A1 and A2 are computed.

$A1 = 0.0$ $A2 = 5.64879$

Input to the Linear Programming function is given in TABLE 16.

TABLE 16

Objective
{0., 0., 0.15, 0.15}
Coefficients
{{0, 6.64563, −0.15, −0.15}, {0, 0, 1., 1.},
{0., 0., 1., 0.}, {0., 0., 0., 1.}, {1, 0., 0., 0.}, {0., 1, 0. ,0.},
{1., 0., 0., 0.}, {0., 1., 0., 0}, {0., 0., 1., 0.}, {0., 0., 0., 1.}}
RHS
{{0., 0}, {1., 0}, {0.25, −1}, {0.75, −1},
{0., −1}, {0.05, −1}, {0., 1}, {0., 1}, {0., 1}, {0., 1}}

LP solution is executed (900)

```
(* ************************************ *)
(*           OPTIMIZE SOLUTION           *)
(* ************************************ *)
LinearProgramming [objfun, coefmat, rhs]
```

With results

{0., 0.0708116, 025, 0.75}

Where $\beta 2 = 0.0$ $\beta = 0.0708116$

Lunit=0.25

L=0.75

This simple problem may be solved analytically to check the LP results. The collateral from MLP Units of 0.250 million, is considered a finance cost, plus the interest cost is 0.15*1.00 = 0.150 million.

| | | |
|---|---|---|
| RAV for 100% ORRI = | 5.64879 million = | A2 |
| Cost for 100% ORRI = | 4.0 million | |
| Exchange ratio = | 5.64879/4.0 = | 1.4121975 |
| For finance costs + collateral | | |
| 0.250 + 0.150 = | 0.400 million | |
| (0.400/1.4121975)/4.0 = | 0.0708 ORRI | |

Financing, is possible with 7.08% of the available 10% non-producing ORRI, and satisfies the required loan amount of 1.0 million, the financing constraint of 75% limit on corporate loans, the Financial target return, and the MLP 410 target return.

The third example is a low risk financing of producing wells. Financing of producing asset packages for acquisitions is quite common, but Asset Exchange has never been used in the process. Because of the large number of producing wells, the risk is low to moderate for most packages. The MLPFS 2000 key to financing in this market is asset exchange between industry markets and MLP 410 to create a new asset class for financing, to improve values through arbitrage, access large capital markets, and provide liquidity.

Company 110 wants to borrow 50 million dollars for 5 years in order to acquire 100 producing assets. MLPFS 2000 will pay all financing costs.

Company projections show an Expected Value of 50.0 million for the working interest, but the decline is uncertain with the worst possible outcome of 48.0 million, and the best possible outcome of 53.0 million with statistical properties of:

| | |
|---|---|
| Mean (Expected Value) | 50.0 million |
| Variance | 1.0 |
| Standard Deviation (SD) | 1.0 million |

For assets with the number of wells, N, greater than 30 the sampling distribution of means is a normal distribution irrespective of the underlying distribution of the population values. The volatility of a sample can be completely described in terms of a normal distribution. Under these circumstances the Standard Deviation is related to the Expected Value (sample mean) by:

Within EV+1 SD with 68% probability

Within EV+2 SD with 95% probability

Within EV+3 SD with 98% probability

From the volatility the financier sees that there is a 98% probability that the asset portfolio will be greater than 47.0, but is constrained by regulations to 80% of asset value. The maximum asset loan is therefore 40.0 million. In addition, the financier will lend an additional 2.5 million as a corporate loan. The balance of 7.5 million must be financed through the MLPFS 2000.

The producing assets have a high net revenue interest, so the company creates a 10% ORRI to be used to enable the loan or reduce the financial costs. By industry convention, the ORRI is priced at about twice the working interest asset value per net revenue percent. The ORRI price is ORRIvalue=2*0.05*50.0=10 million With a FNR of FnrORRIP=2*100.0*0.05=10 million The MLP target yield is 12%.

The financier's target yield may be estimated from a low risk loan. The financing market for a low risk loan is the most competitive market and represents the minimum conditions for financing. Assuming constant payments over the life of the loan, then the financier's target yield for a five year risk free loan at 6% is given by:

$$\text{yield} = \frac{\text{int} * n}{1 - (1 + \text{int}) - n} - 1$$

Finance target yield=0.186982

Details of input parmeters for the corporation, financier, and MLP are shown in Tables 17, 18 & 19.

TABLE 17

| Variable | Value | Description |
|---|---|---|
| LoanC | 50. | Company requested loan amount |
| obj | min | Objective of optimization(max, min) |
| option1 | 1 | Option flag, finance options |
| ORRImaxP | 0.2 | Maximum producing ORRI to be used in asset exchange |
| ORRImaxNP | 0. | Maximum non-producing ORRI to be used in asset exchange |
| β2 | Null | P, Share of producing ORRI used for asset exchange |
| β | 0. | NP, Share of ORRI used for asset exchange for MLP |
| γ | 0. | Purchase price as fraction of FNR for producing ORRI |
| fnrORRIP | 200. | Future Net Revenue of producing ORRI |
| costP | 100. | Producing market price of producing ORRI |
| p | 0. | NP Probability of success |
| R | 0. | NP Best possible Future revenues |
| costNP | 0. | Non-Producing market price of non-producing ORRI |

TABLE 18

| Variable | Value | Description |
|---|---|---|
| Financetargetyield | 0.182 | Minimum yield for financing to occur |
| LassetP | 0. | loan for producing assets |
| Lcorp | 0.8 LoanC | loan to corporations |
| Lunsecured | 0. | loan unsecured such as second mortgage |
| LCunit1 | 1 + financetargetyield | loan for MLP units |
| LCI | financetargetyield | Corporate loan |
| maxloan1 | 0.2 LoanC | Maximum loan for MLP units |
| maxloan2 | 0.05 LoanC | Maximum corporate loan |

TABLE 19

| Variable | Value | Description |
|---|---|---|
| MLPtarget | 0.12 | MLP target yield given by MLP management |
| MLPcost | 20. | stock market price of MLP unit |
| MLPunitdiv | 0.06 | dividend rate relating annual income to unit value |
| r | 0.05 | MLP risk aversion |

Objective
{0., 0., 1.18, 0.18, 0.18}
Coefficients
{{176., 0., −1.18, −0.18, −0.18}, {0, 0, 1., 1., 1.}, {0., 0., 1., 0., 0.},
{0., 1, 0., 0., 0.}, {1, 0., 0., 0., 0.}, {0., 1, 0. ,0., 0.},
{0., 0., 1., 0., 0}, {0., 0., 0., 1., 0.}, {0., 0., 0., 0., 1.}}
RHS
{{0., 0}, {50., 0}, {10., −1}, {40., −1}, {2.5, −1}
{0.2, −1}, {0., −1}, {0., 1}, {0., 1}, {0., 1}, {0., 1}, {0., 1}}
Executing the solution
(*  ****************************************  *)
(*                OPTIMIZE SOLUTION            *)
(*  ****************************************  *)
LinearProgramming [objfun, coefmat, rhs]
With results
{0.09375, 0., 7.5, 40., 2.5}
Where
β2 = 0.09375
β = 0.0
LUnits = 7.5
Lassets = 40.0
Lcorp = 2.5

MLPFS 2000 has contributed 7.5 million (15% of the total financing) and paid all financial costs. Asset loans of 40.0 million and corporate loans of 2.5 million make up the remaining financing requirements. MLPFS 2000 made financing possible.

An embodiment of MLPFS 2000 is a method for providing financing to a company having a plurality of qualified producing assets comprising: creating a qualified master limited partnership by limiting a plurality of assets of master limited partnership to only qualified producing assets that do not generate unrelated business taxable income, complying with all necessary requirements so that the qualified master limited partnership can exchange assets with a plurality of companies on a stock exchange; creating a first new asset class by placing the plurality of qualified producing assets into the qualified master limited partnership through a plurality of tax deferred asset exchanges of qualified master limited partnership Units for a plurality of fractional interests in the plurality of qualified producing assets and; collateralizing a loan using the plurality of Units in the qualified master limited partnership in accordance with a solution that satisfies a plurality of requirements specified by a loan provider, the company, and the qualified master limited partnership. The first new asset class may be valued through a market arbitrage to identify an arbitrage value. The arbitrage value is based on a stock market price. Moreover a diversification of interests in the asset class achieves a risk reduction for the loan provider. The asset class is subject to a first financing regulation. A liquidity is created for the loan because the plurality of Units in the qualified master limited partnership are tradable on a stock exchange and the qualified master limited partnership meets all requirements of the stock exchange to ensure tradability. The qualified producing asset may be a mineral interest, a royalty interest, an overriding royalty interest.

Furthermore, a second new asset class can be created through exchange of a qualified producing asset for Units of a qualified master limited partnership wherein the company elects not to take a tax deferral to realize an increase in asset value, liquidity, and risk reduction for financing purposes. The second new asset class is valued through market arbitrage to identify an arbitrage value. The arbitrage value is based on a stock market price. A diversification of interests in the qualified master limited partnership achieves a risk reduction for the loan provider. The new asset class is subject to a second financing regulation and is not subject to the first financing regulation. In an embodiment, an asset holding company acquires a non-producing asset that has a potential to become a producing asset; and the non-producing asset has an increased value based upon the non-producing asset's potential to become a producing asset that can be exchanged for Units of the qualified master limited partnership. The arbitrage value is based on a plurality of risk factors, a risk adjusted value, and a risk adjusted value per dollar. When the non-producing asset becomes a new producing asset, performing a tax deferred asset exchange of qualified master limited partnership Units for a plurality of fractional interests in the new producing asset.

In a further embodiment, an asset holding company acquires a non-producing asset that has a potential to become a producing asset; and the non-producing asset has an increased value based upon the non-producing asset's potential to become a producing asset that can be exchanged for Units of the qualified master limited partnership.

In a further embodiment, MLPFS is a method for adding value to a company's non-producing assets. The method creates a qualified master limited partnership by limiting a master limited partnership to hold only assets that are qualified producing assets; creates an asset holding company to acquire a non-producing asset that has a potential to become a producing asset; and the non-producing asset has an increased value based upon the non-producing asset's potential to become a qualified producing asset that can be exchanged for Units of the qualified master limited partnership and used to collateralize a loan; and a qualified producing asset is a producing asset that does not generate unrelated business taxable income.

In a further embodiment, a service provider calculates a solution to determine a collateralization for one or more loans to be provided to a company that satisfies a plurality of requirements submitted by a loan provider, a qualified master limited partnership, and the company.

A preferred form of the invention has been shown in the drawings and described above, but variations in the preferred form will be apparent to those skilled in the art. Although the invention has been described with respect to oil and gas royalties, the invention can be applied to the financing and development of any depleting natural resource. The preceding description is for illustration purposes only, and the invention should not be construed as limited to the specific form shown and described. The scope of the invention should be limited only by the language of the following claims.

What is claimed is:

1. A method for adding value to a company's non-producing assets comprising:
   creating a qualified master limited partnership by limiting a master limited partnership to hold any assets that are qualified producing assets;
   creating an asset holding company to acquire a non-producing asset that can become a qualified producing asset; and
   a computer, responsive to the non-producing asset becoming a qualified producing asset, calculating a mathematical solution enabling an exchange of interests in the qualified producing asset for one or more units of the qualified master limited partnership;
   the computer collaterizing a loan using the one or more units of the qualified master limited partnership; and
   wherein a qualified producing asset is a producing asset that does not generate unrelated business taxable income.

2. A system for providing financing to a company having a plurality of qualified producing assets comprising:
   one or more computers connected to one or more storage devices; a plurality of instructions stored in the one or more storage devices, the plurality of instructions configured to cause one or more of the processors of the one or more computers to perform actions comprising:
   creating a qualified master limited partnership by limiting a plurality of assets of a master limited partnership to only a plurality of qualified producing assets of a company that do not generate unrelated business taxable income;
   complying with all necessary requirements so that the qualified master limited partnership can exchange assets with a plurality of companies on a stock exchange; creating a first new asset class by placing the plurality of qualified producing assets into the qualified master limited partnership through a plurality of tax deferred asset exchanges of a plurality of qualified master limited partnership Units for a plurality of fractional interests in the plurality of qualified producing assets; and
   collateralizing a loan to the company by a loan provider using the plurality of Units in the qualified master limited partnership in accordance with a mathematical solution that satisfies a plurality of mathematical requirements specified by the loan provider, the company, and the qualified master limited partnership.

3. A system for providing financing to a company having a plurality of qualified producing assets, comprising:
   one or more computers connected to one or more storage devices;
   a plurality of instructions stored in the one or more storage devices, the plurality of instructions configured to cause one or more of the processors of the one or more computers to perform actions comprising:
   limiting a qualified master limited partnership to acquire and hold only producing assets that do not generate unrelated business taxable income and so that the qualified master limited partnership can exchange assets with one or more companies;
   connecting the qualified master limited partnership by a network, to the one or more companies, to one or more loan providers, and to a computer-implemented computational system configured to receive a plurality of company inputs from the one or more companies, a plurality of qualified master limited partnership inputs from one or more qualified master limited partnerships, and a plurality of loan provider inputs from one or more loan providers;

pooling the total assets acquired and held by the qualified master limited partnership into a plurality of fractional interests, each fractional interest represented by a Unit; and responsive to receiving, by a processor of a computer-implemented computational system, one or more company inputs from the one or more companies, one or more qualified master limited partnership inputs from the one or more qualified master limited partnerships, and one or more loan provider inputs from the one or more loan providers, calculating a mathematical solution enabling an exchange of one or more of the plurality of fractional interests in one or more qualified producing assets of the company for one or more qualified master limited partnership Units and a collateralization of one or more loans to the company by one or more loan providers using one or more qualified master limited partnership Units in accordance with a solution that satisfies the plurality of company inputs, the plurality of qualified master limited partnership inputs, and the plurality of loan provider inputs.

\* \* \* \* \*